(12) United States Patent
Fu et al.

(10) Patent No.: US 10,496,052 B2
(45) Date of Patent: Dec. 3, 2019

(54) SYSTEMS, METHODS AND DEVICES FOR VECTOR CONTROL OF INDUCTION MACHINES USING ARTIFICIAL NEURAL NETWORKS

(71) Applicant: The Board of Trustees of the University of Alabama, Tuscaloosa, AL (US)

(72) Inventors: Xingang Fu, Tuscaloosa, AL (US); Shuhui Li, Northport, AL (US)

(73) Assignee: The Board of Trustees of the University of Alabama, Tuscaloosa, AL (US)

(*) Notice: Subject to any disclaimer, the term of this patent is extended or adjusted under 35 U.S.C. 154(b) by 393 days.

(21) Appl. No.: 15/095,333

(22) Filed: Apr. 11, 2016

(65) Prior Publication Data

US 2016/0301334 A1    Oct. 13, 2016

Related U.S. Application Data

(60) Provisional application No. 62/145,909, filed on Apr. 10, 2015.

(51) Int. Cl.
*H02P 21/14* (2016.01)
*G05B 13/02* (2006.01)
*H02P 6/34* (2016.01)

(52) U.S. Cl.
CPC .............. *G05B 13/027* (2013.01); *H02P 6/34* (2016.02); *H02P 21/14* (2013.01); *H02P 2207/01* (2013.01)

(58) Field of Classification Search
None
See application file for complete search history.

(56) References Cited

U.S. PATENT DOCUMENTS 5,365,158 A * 11/1994 Tanaka .................... H02P 21/09
                                                    318/806
5,396,415 A *  3/1995 Konar .................. G05B 13/027
                                                    700/42
6,442,535 B1 *  8/2002 Yifan ..................... H02P 25/08
                                                    310/165

(Continued)

FOREIGN PATENT DOCUMENTS

WO    2008137836 A1    11/2008

OTHER PUBLICATIONS

"Induction motor (ACMOT4166) data sheet form Motorsolver LLC", [Online]. Available: http://motorsolver.com/wp/wp-content/uploads/2015/03/4-DYNO-IM-SPECS-small.pdf.

(Continued)

*Primary Examiner* — Thomas C Lee
*Assistant Examiner* — Gary Collins
(74) *Attorney, Agent, or Firm* — Meunier Carlin & Curfman LLC

(57) ABSTRACT

Described herein is a neural network-based vector control method for the induction motor. The disclosure includes an approach to implement optimal vector control for an induction motor by using an NN; a NN controller to substitute two decoupled proportional-integral (PI) controllers in current loop; and, a mechanism to train the NN controller by using a Levenberg-Marquardt (LM)+forward accumulation through time (FATT) algorithm.

12 Claims, 21 Drawing Sheets

(56) References Cited

U.S. PATENT DOCUMENTS

| | | | | |
|---|---|---|---|---|
| 6,532,454 | B1* | 3/2003 | Werbos | G05B 13/027 706/14 |
| 6,710,574 | B2 | 3/2004 | Davis et al. | |
| 6,922,036 | B1* | 7/2005 | Ehsani | H02P 25/098 318/432 |
| 7,243,006 | B2* | 7/2007 | Richards | G06F 17/5036 318/801 |
| 8,030,791 | B2 | 10/2011 | Lang et al. | |
| 8,577,508 | B2 | 11/2013 | Li et al. | |
| 9,379,546 | B2 | 6/2016 | Li | |
| 2003/0218444 | A1 | 11/2003 | Marcinkiewicz et al. | |
| 2005/0184689 | A1 | 8/2005 | Maslov et al. | |
| 2008/0315811 | A1 | 12/2008 | Hudson et al. | |
| 2011/0089693 | A1 | 4/2011 | Nasiri et al. | |
| 2012/0056602 | A1 | 3/2012 | Li et al. | |
| 2012/0112551 | A1 | 5/2012 | Li et al. | |
| 2014/0362617 | A1 | 12/2014 | Li et al. | |
| 2015/0039545 | A1* | 2/2015 | Li | G05B 13/027 706/23 |

OTHER PUBLICATIONS

Barnard, "Temporal-Difference Methods and Markov Models," IEEE Transactions on Systems, Man, and Cybernetics, vol. 23, No. 2, 1993, pp. 357-365.

Balakrishnan, et al., "Adaptive-critic-based neural networks for aircraft optimal control", J. Guidance, Control, Dyn., vol. 19, No. 4, 1996, 893-898.

Ben-Brahim, et al., "Identification of induction motor speed using neural networks", Proc. Power Convers. Conf., Yokohama, Japan, 1993, 689-694.

Bishop, "Neural Networks for Pattern Recognition," Oxford University Press, 1995, 495 pages (submitted as two documents—Part I and Part 2).

Carrasco, et al., "Power-Electronic Systems for the Grid Integration of Renewable Energy Sources: A Survey," IEEE Transactions on Industrial Electronics, vol. 53, No. 4, 2006, pp. 1002-1016.

Chan, "The State of the Art of Electric and Hybrid Vehicles," Proceedings of the IEEE, vol. 90, No. 2, 2002, pp. 224-279.

Dannehl, et al., "Limitations of voltage-oriented pi current control of grid-connected PWM rectifiers with LCL filters", IEEE Trans. Ind. Electron., vol. 56, No. 2, 2009, 380-388.

Fairbank, M., et al., "An Adaptive Recurrent Neural Network Controller using a Stabilization Matrix and Predictive Inputs to Solve the Tracking Problem under Disturbances," Neural Networks, vol. 49, 2013, 35 pages.

Fairbank, et al., "The Divergence of Reinforcement Learning Algorithms with Value-Iteration and Function Approximation," Proceedings of the IEEE International Joint Conference on Neural Networks (IJCNN'12), IEEE Press, 2012, pp. 3070-3077.

Feldkamp, et al., "A Signal Processing Framework Based on Dynamic Neural Networks with Application to Problems in Adaptation, Filtering, and Classification," Proceedings of the IEEE, vol. 86, No. 11, 1998, pp. 2259-2277.

Figueres, et al., "Sensitivity Study of the Dynamics of Three-Phase Photovoltaic Inverters with an LCL Grid Filter," IEEE Transactions on Industrial Electronics, vol. 56, No. 3, 2009, pp. 706-717.

Fu, et al., "Implement optimal vector control for LCLfilter-based grid-connected converters by using recurrent neural networks", IEEE Trans. Ind. Electron., vol. 62, No. 7, 2015, 4443-4454.

Fu, et al., "Training recurrent neural networks with the Levenberg-Marquardt algorithm for optimal control of a grid-connected converter", IEEE Trans. Neural Netw. Learn. Syst vol. 26 No. 9, 2015b, 1900-12.

Glanzmann, "FACTS Flexible Alternating Current Transmission Systems", 2005.

Hagan, et al., "Training feedforward networks with the Marquardt algorithm", IEEE Trans. Neural Netw., vol. 5, No. 6, 1994, 989-993.

Hochreiter, et al., "Long Short-Term Memory," Neural Computation, vol. 9, No. 8, 1997, pp. 1735-1780.

Kenne, et al., "An Online Simplified Rotor Resistance Estimator for Induction Motors", IEEE Trans. Control Syst. Technol., vol. 18, No. 5, 2010, 1188-1194.

Kirk, "Optimal Control Theory: An Introduction," Chapters 1-3, Prentice-Hall, Englewood Cliffs, NJ, 1970, 471 pages.

Levenberg, et al., "A method for the solution of certain non-linear problems in least squares", Quart. J. Appl. Math., vol. 2, No. 2, 1994, 164-168.

Li, et al., "Analysis of decoupled d-q vector control in DFIG back-to-back PWM converter", IEEE Power Eng. Soc. Gen. Meeting, 2007, 1-7.

Li, et al., "Artificial neural networks for control of a grid-connected rectifier/inverter under disturbance, dynamic and power converter switching conditions", IEEE Trans. Neural Netw. Learning Syst, vol. 25, No. 4, 2014, 738-750.

Li, et al., "Vector control of a grid-connected rectifier/inverter using an artificial neural network", in Proc. IEEE World Congr. Comput. Intell., Brisbane, Australia, 2012, 1-7.

Li, et al., "Control of HVDC Light System Using Conventional and Direct Current Vector Control Approaches," IEEE Transactions on Power Electronics, vol. 25, No. 12, 2010, pp. 3106-3118.

Li, et al., "Conventional and Novel Control Designs for Direct Driven PMSG Wind Turbines," Electric Power System Research, vol. 80, Issue 3, 2010, pp. 328-338.

Li, et al., "Direct-current Vector Control of Three-Phase Grid-Connected Rectifier-Inverter," Electric Power Systems Research, vol. 81, No. 2, 2011, pp. 357-366.

Li, et al., "Nested-Loop Neural Network Vector Control of Permanent Magnet Synchronous Motors," The 2013 International Joint Conference on Neural Network, Dallas, Texas, 2013, 8 pages.

Li, et al., "The Comparison of Control Strategies for the Interior PMSM Drive used in the Electric Vehicle," The $25^{th}$ World Battery, Hybrid and Fuel Cell Electric Vehicle Symposium & Exhibition, Shenzhen, China, 2010, 6 pages.

Luo, et al., "Fuzzy-PI-Based Direct-Output-Voltage Control Strategy for the STATCOM Used in Utility Distribution Systems," IEEE Transactions on Industrial Electronics, vol. 56, No. 7, 2009, pp. 2401-2411.

Malfait, "Audible noise and losses in variable speed induction motor drives with IGBT inverters-influence of the squirrel cage design and the switching frequency", Proc. IEEE Ind. Appl. Soc. Annu. Meeting, Denver, CO, USA, 1994, 693-700.

Marino, et al., "On-line stator and rotor resistance estimation for induction motors", IEEE Trans. Control Syst. Technol., vol. 8, No. 3, 2009, 570-579.

Marquardt, et al., "An algorithm for least-squares estimation of nonlinear parameters", J. Soc. Ind. Appl. Math., vol. 11, No. 2, 1994, 164-168.

Mullane, et al., "Wind-Turbine Fault Ride-Through Enhancement," IEEE Transactions on Power Systems, vol. 20, No. 4, 2005, pp. 1929-1937.

Park, et al., "New External Neuro-Controller for Series Capacitive Reactance Compensator in a Power Network," IEEE Transactions on Power Systems, vol. 19, No. 3, 2004, pp. 1462-1472.

Pena, et al., "Doubly fed induction generator using back-to-back PWM converters and its application to variable-speed wind-energy generation," Electric Power Applications, IEEE Proceedings, vol. 143, Issue 3, 1996, pp. 231-241.

Peng, et al., "Speed control of induction motor using neural network sliding mode controller", Proc. Int. Conf. Electr. Inf. Control Eng., Wuhan, China, 2011, 6125-6129.

Qiao, et al., "Coordinated Reactive Power Control of a Large Wind Farm and a STATCOM Using Heuristic Dynamic Programming," IEEE Transactions on Energy Conversion, vol. 24, No. 2, 2009, pp. 493-503.

Qiao, et al., "Fault-Tolerant Optimal Neurocontrol for a Static Synchronous Series Compensator Connected to a Power Network," IEEE Transactions on Industry Applications, vol. 44, No. 1, 2008, pp. 74-84.

Qiao, et al., "Optimal Wide-Area Monitoring and Nonlinear Adaptive Coordinating Neurocontrol of a Power System with Wind

(56) References Cited

OTHER PUBLICATIONS

Power Integration and Multiple FACTS Devices," Neural Networks, vol. 21, No. 2, 2008, pp. 466-475.
Qiao, et al., "Real-Time Implementation of a STATCOM on a Wind Farm Equipped With Doubly Fed Induction Generators," IEEE Transactions on Industry Applications, vol. 45, No. 1, 2009, pp. 98-107.
Prokhorov, et al., "Adaptive Behavior with Fixed Weights in RNNs: An Overview," Proceedings of the 2002 International Joint Conference on Neural Networks, (IJCNN'02), vol. 3, IEEE Press, 2002, pp. 2018-2022.
Prokhorov, et al., "Adaptive critic designs", IEEE Trans. Neural Netw., volEEE Trans. Neural Netw., vol. 8, No. 5, 1997, 997-1107.
Rabelo, et al., "Reactive Power Control Design in Double Fed Induction Generators for Wind Turbines," IEEE Transactions on Industrial Electronics, vol. 56, No. 10, 2009, pp. 4154-4162.
Restrepo, et al., "ANN based current control of a VSI fed AC machine using line coordinates", Proc. 5th IEEE Int. Caracas Conf. Devices Circuits Syst, 2004, 225-229.
Restrepo, et al., "Induction machine current loop neurocontroller employing a Lyapunov based training algorithm", Proc. IEEE Power Eng. Soc. Gen. Meeting, Tampa, FL, USA, 2003, 1-8.
Riedmiller, "A Direct Adaptive Method for Faster Backpropagation Learning: The RPROP Algorithm," Proceedings of the IEEE International Conference on Neural Networks, San Francisco, CA, 1993, pp. 586-591.
Sarangapani, "Neural Newtwork Control of Nonlinear Discrete-Time Systems", IEEE Trans on Neural Networks vol. 9, No. 12, 2008, 2073-2087.
Venayagamoorthy, et al., "Comparison of heuristic dynamic programming and dual heuristic programming adaptive critics for neurocontrol of a turbogenerator", IEEE Trans. Neural Netw., vol. 13, No. 3, 2002, 764-773.
Venayagamoorthy, et al., "Implementation of Adaptive Critic-Based Neurocontrollers for Turbogenerators in a Multimachine Power System," IEEE Transactions on Neural Networks, vol. 14, No. 5, 2003, pp. 1047-1064.
Wang, et al., "Short-Time Overloading Capability and Distributed Generation Applications of Solid Oxide Fuel Cells," IEEE Transactions on Energy Conversion, vol. 22, No. 4, 2007, pp. 898-906.
Wang, et al., "Adaptive dynamic programming: An introduction", IEEE Comput. Intell. Mag, vol. 4, No. 2, 2009, 39-47.
Werbos, "Backpropagation Through Time: What it Does and How to Do it," Proceedings of the IEEE, vol. 78, No. 10, 1990, pp. 1550-1560.
Werbos, "Backwards Differentiation in AD and Neural Nets: Past Links and New Opportunities," Automatic Differentiation: Applications, Theory and Implementations, Bücker, H., et al., Lecture Notes in Computational Science and Engineering, Springer, 2005, pp. 15-34.
Werbos, "Neural Networks, System Identification, and Control in the Chemical Process Industries," Handbook of Intelligence Control, Chapter 10, Section 10.6.1-10.6.2, White, Sofge, eds., New York, Van Nostrant Reinhold, New York, 1992, pp. 283-356, www.werbos.com.
Werbos, P.J., "Stable Adaptive Control Using New Critic Designs," eprint arXiv:adap-org/9810001, Sections 77-78, 1998.
Werbos, P.J., "Approximate Dynamic Programming for Real-Time Control and Neural Modeling," Handbook of Intelligent Control, Chapter 13, White, Sofge, eds.,New York, Van Nostrand Reinhold, 1992, pp. 493-525.
Xu, et al., "Dynamic Modeling and Control of DFIG-Based Wind Turbines Under Unbalanced Network Conditions," IEEE Transactions on Power Systems, vol. 22, No. 1, 2007, pp. 314-323.
International Search Report, dated Nov. 6, 2014, in corresponding International Application No. PCT/US2014/049724.
Notice of allowance issued for co-pending U.S. Appl. No. 15/149,560, dated Oct. 11, 2018.
Xu, et al., "Active Damping-Based Control for Grid-Connected LCL-Filtered Inverter with Injected Grid Current Feedback Only", IEEE Trans. Ind. Electron., vol. 61, No. 9, pp. 4746-4758, 2014.
OPAL-RT website, available: http://www.opal-rt.com/ (accessed Jan. 9, 2018).
Alepuz, et al., "Control strategies based on symmetrical components for grid-connected converters under voltage dips," IEEE Trans. Ind. Electronics. vol. 56, No. 6, Jul. 2009, pp. 2162-2173.
AlSharidah, "An Active Method for Implementing the Unintentional Islanding Test in Distributed Generation Systems", Ph.D. thesis, Faculty of Graduate Studies, The University of British Columbia, Vancouver, Canada, Dec. 2012.
Bahrani, et al. "High-order vector control of grid-connected voltage-source converters with LCL-filters," IEEE Trans. Ind. Electron., vol. 61, No. 6, pp. 2767-2775, Jun. 2014.
Bahrani, et al. "Multivariable-PI-based dq current control of voltage source converters with superior axis decoupling capability," IEEE Trans. Ind. Electron., vol. 58, No. 7, pp. 3016-3026, Jul. 2011.
Bahrani, et al., "Decoupled dq-current control of grid-tied voltage source converters using nonparametric models," IEEE Trans. Ind. Electron., vol. 60, No. 4, pp. 1356-1366, Apr. 2013.
Bahrani, et al., "Vector control of single-phase voltage-source converters based on fictive-axis emulation," IEEE Transactions on Industry Applications, vol. 47, No. 2, pp. 831-840, Mar./Apr. 2011.
Bao, et al., "Step-by-step controller design for LCL-type grid-connected inverter with capacitor-current-feedback active-damping," IEEE Trans. Power Electron., vol. 29, No. 3, pp. 1239-1253, Mar. 2014.
Belhadj, et al., "Investigation of Different Methods to Control a Small Variable-Speed Wind Turbine with PMSM Drives," Journal of Energy Resources Technology, Transactions of the ASME, vol. 129, Sep. 2007, pp. 200-213.
Bierhoff, et al., "Active damping for three-phase PWM rectifiers with high-order line-side filters," IEEE Trans. Ind. Electron., vol. 56, No. 2, pp. 371-379, Feb. 2009.
Blasko, et al., "A novel control to actively damp resonance in input LC filter of a three-phase voltage source converter," IEEE Transactions on Industry Applications, vol. 33, No. 2, pp. 542-550, 1997.
Castilla, et al., "Linear Current Control Scheme with Series Resonant Harmonic Compensator for Single-Phase Grid-Connected Photovoltaic Inverters," IEEE Ind. Electronics, vol. 55, No. 7, Jul. 2008, pp. 2724-2733.
Castilla, et al., "Control design guidelines for single-phase grid-connected photovoltaic inverters with damped resonant harmonic compensators," IEEE Transactions on Industrial Electronics, vol. 56, No. 11, pp. 4492-4501, Nov. 2009.
Czarnecki, "Instantaneous reactive power p-q theor and power properties of three-phase systems," IEEE Transactions on Power Delivery, vol. 21, No. 1, pp. 362-367, Jan. 2006.
Czarnecki, "Comparison of instantaneous reactive power p-q theory with theory of the current's physical components," Electrical Engineering, vol. 85, No. 1, pp. 21-28, Jan. 2003.
Dai, et al., "Power flow control of a single distributed generation unit," IEEE Trans. Power Electron., vol. 23, No. 1, pp. 343-352, Jan. 2008.
Dannehl, et al., "Investigation of active damping approaches for PI-based current control of grid-connected pulse width modulation converters with LCL filters," IEEE Trans. Ind. Appl., vol. 46, No. 4, pp. 1509-1517, Jul./Aug. 2010.
Dannehl, et al., "Filter-based active damping of voltage source converters with LCL filter," IEEE Trans. Ind. Electron., vol. 58, No. 8, pp. 3623-3633, Aug. 2011.
Dannehl, et al., "PWM rectifier with LCL-filter using different current control structures," in Proc. European Cont. on Power Electron. and Applicat., Aalborg, Denmark, Sep. 2007.
Dasgupta, et al., "Single-phase inverter control techniques for interfacing renewable energy sources with microgrid-part I: Parallel-connected inverter topology with active and reactive power flow control along with grid current shaping," IEEE Transactions on Power Electronics, vol. 26, No. 3, pp. 717-731, Mar. 2011.
Dasgupta, et al., "Single-phase inverter control techniques for interfacing renewable energy sources with microgrid-part II: Series-connected inverter topology to mitigate voltage-related problems

(56) References Cited

OTHER PUBLICATIONS along with active power flow control," IEEE Transactions on Power Electronics, vol. 26, No. 3, pp. 732-746, Mar. 2011.
dSPACE DS1103 PPC Controller Board website, available:https://www.dspace.com/en/pub/home/support/pli/elas/elads1103.cfm (accessed Jan. 9, 2018).
El-Habrouk, et al., "Active power filters: A review," IEEE Proc. Electric Power Applications, vol. 147, issue 5, pp. 403-413, 2000.
Festo Didactic website, available: https://www.labvolt.com/ (accessed Jan. 9, 2018).
Gagnon, "Wind Farm—DFIG Detailed Model," The MathWork, Jan. 2009.
Hanif, et al., "Two degrees of freedom active damping technique for LCL filter-based grid connected pv systems," IEEE Trans. Ind. Electron., vol. 61, No. 6, pp. 2795-2803, Jun. 2014.
Houari, et al., "Large signal stability analysis and stabilization of converters connected to grid through LCL filters," IEEE Trans. Ind. Electron., vol. 61, No. 12, pp. 6507-6516, Dec. 2014.
IEEE Recommended Practices and Requirements for Harmonic Control in Electric Power Systems, IEEE Standards 519-1992, 1992.
Jalili, et al., "Design of LCL filters of active-front-end two-level voltage-source converters," IEEE Transactions on Industrial Electronics, vol. 56, No. 5, pp. 1674-1689, May 2009.
Karanayil, et al., "Performance Evaluation of Three-Phase Grid-Connected Photovoltaic Inverters Using Electrolytic or Polypropylene Film Capacitors," IEEE Trans. Sustain. Energy. vol. 5, No. 4, pp. 1297-1306, Oct. 2014.
Khadkikar, et al., "Generalised single-phase p-q theory for active power filtering: simulation and DSP-based experimental investigation," IET Power Electronics, vol. 2, No. 1, pp. 67-78, Jan. 2009.
Kjaer, et al, "A review of single-phase grid-connected inverters for photovoltaic modules," IEEE Transactions on Industry Applications, vol. 41, No. 5, pp. 1292-1306, Sep./Oct. 2005.
Lettl, et al., "Comparison of different filter types for grid connected inverter," Progress in Electromagnetics Research Symposium Proc., Marrakesh, Morocco, Mar. 20-23, 2011, pp. 1426-1429.
Li, et al., "Control of DFIG Wind Turbine with Direct-Current Vector Control Configuration," IEEE Trans. Sustain. Energy, vol. 3, No. 1, pp. 1-11, Jan. 2012.
Liserre, et al., "Design and control of an LCL-filter based three-phase active rectifier," IEEE Transactions on Industrial Applications, vol. 41, No. 5, pp. 1281-1291, Oct. 2005.
Liserre, et al., "Genetic algorithm-based design of the active damping for an LCL-filter three-phase active rectifier," IEEE Trans. Power Electron., vol. 19, No. 1, pp. 76-86, Jan. 2004.
Liu, et. al., "A novel design and optimization method of an LCL filter for a shunt active power filter," IEEE Trans. Ind. Electron., vol. 61, No. 8, pp. 4000-4010, Aug. 2014.
Marei, et al., "A Coordinated Voltage and Frequency Control of Inverter Based Distributed Generation and Distributed Energy Storage System for Autonomous Microgrids," Electric Power Components and Systems, vol. 41, Issue 4, Feb. 2013, 00. 383-400.
Moreno, et al., "A robust predictive current control for three-phase grid-connected inverters," IEEE Transactions on Industrial Electronics, vol. 56, No. 6, pp. 1993-2004, Jun. 2009.
Pan, et al., "Capacitor-current-feedback active damping with reduced computation delay for improving robustness of LCL-type grid-connected inverter," IEEE Trans. Power Electron., vol. 29, No. 7, pp. 3414-3427, Jul. 2014.

Pena-Alzola, et al., "Analysis of the passive damping losses in LCL-filter-based grid converters," IEEE Trans. Power Electron., vol. 28, No. 6, pp. 2642-2646, Jun. 2013.
Pena-Alzola, et al., "A self-commissioning notch filter for active damping in a three-phase LCL-filter-based grid-tie converter," IEEE Trans. Power Electron., vol. 29, No. 12, pp. 6754-6761, Dec. 2014.
Pogaku, et al., "Modeling, analysis and testing of autonomous operation of an inverter-based microgrid," IEEE Trans. Power Electron., vol. 22, No. 2, pp. 613-625, Mar. 2007.
Rocabert, et al., "Intelligent connection agent for three-phase grid-connected microgrids," IEEE Transactions on Power Electronics, vol. 26, No. 10, pp. 2993-3005, Oct. 2011.
Rockhill, et al., "Grid filter design for a multi-megawatt medium-voltage voltage source inverter," IEEE Trans. Ind. Electron., vol. 58, No. 4, Apr. 2011.
Roshan, et al., "A d-q frame controller for a full-bridge single phase inverter used in small distributed power generation systems," in Proc. IEEE Applied Power Electronics Conference, Anaheim, CA, USA, Mar. 2007, pp. 641-647.
RT-Lab 10.4 User Guide, Opal-RT Technologies Inc., RT-Lab, Montreal, QC, Canada, 2010.
Saitou, et al., "Generalized theory of instantaneous active and reactive powers in single-phase circuits based on hilbert transform," in Proc. Power Electronics Specialists Conference (PESC), Cairns, Queensland, Australia, Jun. 2002, pp. 1419-1424.
Senturk, et al., "Power capability investigation based on electro-thermal models of press-pack IGBT three-level NPC and ANPC VSCs for multimegawatt wind turbines," IEEE Trans. Power Electron., vol. 27, No. 7, pp. 3195-3206, Jul. 2012.
Teodorescu, et al., "Proportional-resonant controllers and filters for grid-connected voltage-source converters," IEE Proc.-Electr. Power Appl., vol. 153, No. 5, pp. 750-762, Sep. 2006.
Wu, et al., "A new design method for the passive damped LCL and LLCL filter-based single-phase grid-tied inverter," IEEE Trans. Ind. Electron., vol. 60, No. 10, oo. 4339-4350, Oct. 2013.
Wu, et al., "A new LCL-filter with in-series parallel resonant circuit for single-phase grid-tied inverter," IEEE Transactions on Industrial Electronics, vol. 61, No. 9, pp. 4640-4644, Sep. 2014.
Wu, et al., "A robust passive damping method for LLCL filter based grid-tied inverters to minimize the effect of grid harmonic voltages," IEEE Trans. Power Electron., vol. 29, No. 7, Jul. 2014, 11 pages.
Wu, et al., "Digital current control of a voltage source converter with active damping of LCL resonance," IEEE Trans. Power Electron., vol. 21, No. 5, pp. 1364-1373, Sep. 2006.
Xiong, et al., "Modeling and Transient Behavior Analysis of an Inverter-based Microgrid," Electric Power Components and Systems, vol. 40, Issue 1, Nov. 2011, pp. 112-130.
Yang, et al., "Impedance shaping of the grid-connected inverter with LCL filter to improve its adaptability to the weak grid condition," IEEE Trans. Power Electron., vol. 29, No. 11, pp. 5795-5805, Nov. 2014.
Zhang, et al., "A grid simulator with control of single-phase power converters in d-q rotating frame," in Proc. IEEE Power Electronics Specialists Conference, Cairns, Queensland, Australia, Jun. 2002, pp. 1431-1436.
Zhang, et al., "Optimal Microgrid Control and Power Flow Study with Different Bidding Policies by Using PowerWorld Simulator," IEEE Trans. Sustain Energy, vol. 5, Issue 1, pp. 282-292, Jan. 2014.
Final Office Action dated May 25, 2018, in connection with U.S. Appl. No. 15/149,560.

* cited by examiner

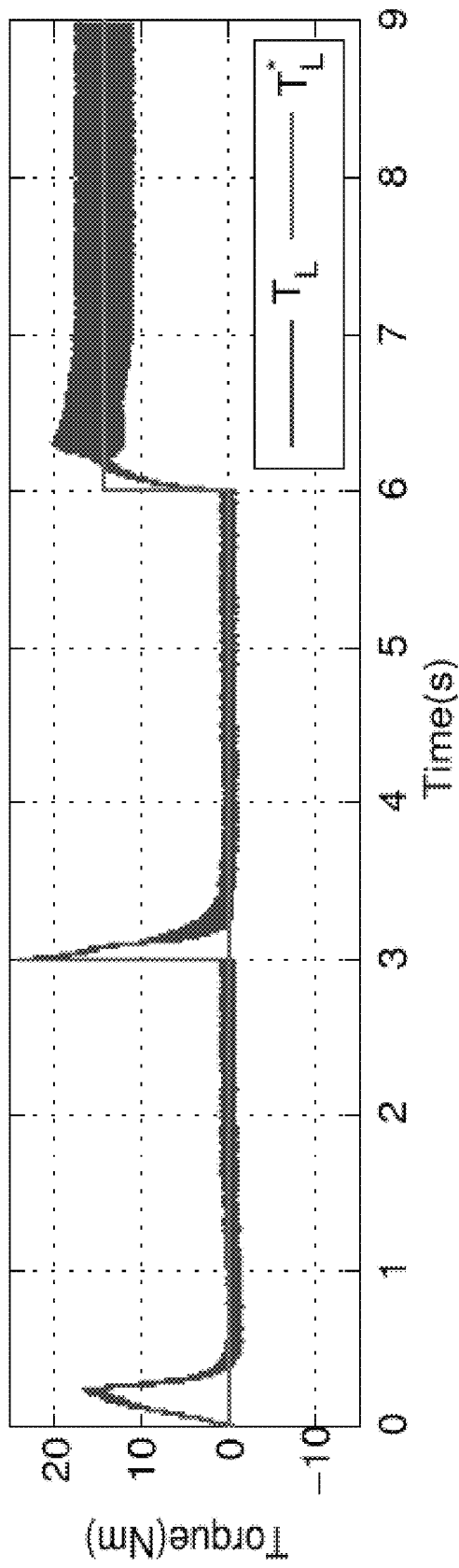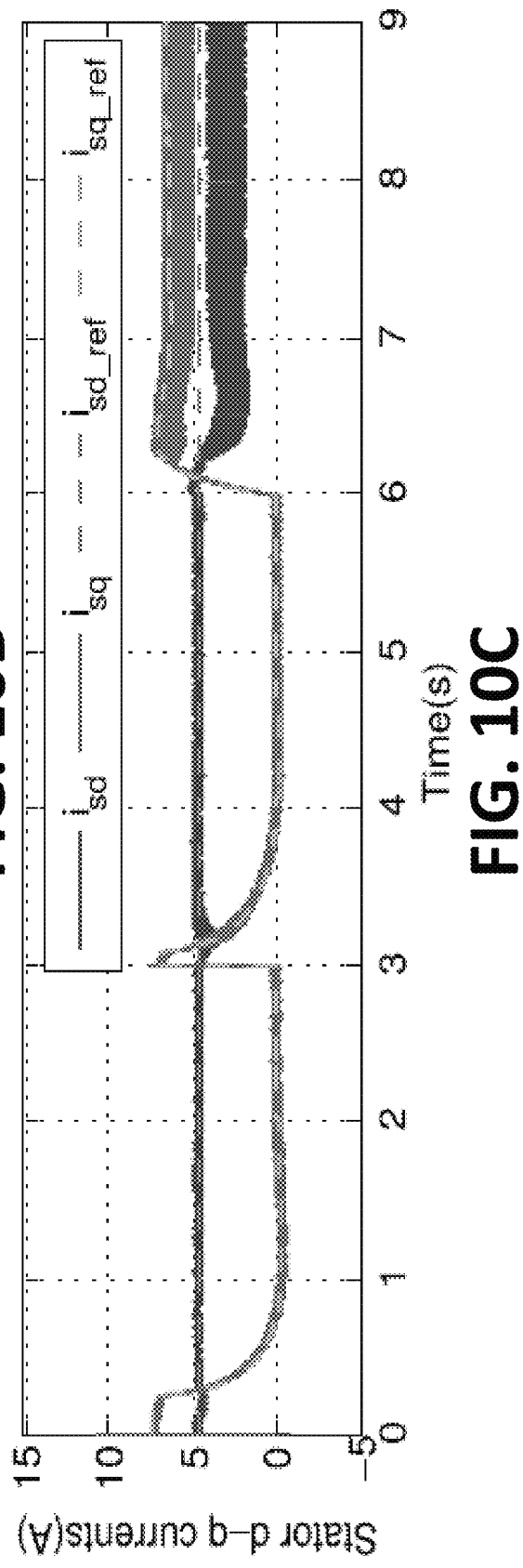
FIG. 10B
FIG. 10C

SYSTEMS, METHODS AND DEVICES FOR VECTOR CONTROL OF INDUCTION MACHINES USING ARTIFICIAL NEURAL NETWORKS

CROSS-REFERENCE TO RELATED APPLICATION

This application claims priority to U.S. Provisional Patent Application No. 62/145,909 filed on Apr. 10, 2015, which is fully incorporated by reference and made a part hereof.

STATEMENT REGARDING FEDERALLY FUNDED RESEARCH

This invention was made with Government support under Grant No. 1414379 awarded by the National Science Foundation. The Government has certain rights in the invention.

BACKGROUND

Three-phase induction motors have been widely used in industrial drives as they are rugged, reliable, and economical. Variable-frequency drives (VFDs) are becoming more popular in variable-speed services because VFDs offer especially important energy-saving opportunities. Thus, many researchers have studied VFD-based control strategies for high performance of induction motor drives. One of these popular methods is the vector control method. Vector control of the induction motor can guarantee the decoupling of torque and flux control and thus control the induction motor linearly as a separated excited dc motor to offer better dynamic response. However, recent studies indicated that the conventional standard vector control strategy has a competing control nature in its current control loop so that true decoupled d- and q-axis loop control does not exist. As a result, the control performance is more sensitive to uncertainties such as unpredictable parameter variation, external load disturbances, and so on.

Therefore, it is important to investigate an effective and intelligent control scheme for enhanced induction motor drive performance. Most intelligent control research works focus on speed loop control based on neural networks. Peng and Zhao (K. Peng and J. Zhao, "Speed control of induction motor using neural network sliding mode controller," in Proc. Int. Conf. Electr. Inf. Control Eng., Wuhan, China, April 2011, pp. 6125-6129 proposed to use a radial basis function neural network in the speed loop to provide better speed control performance, which can avoid the limit calculation under the uncertainties in the induction motor. Ben-Brahim and Kurosawa (L. Ben-Brahim and R. Kurosawa, "Identification of induction motor speed using neural networks," in Proc. Power Conyers. Conf., Yokohama, Japan, April 1993, pp. 689-694) used a backpropagation neural network to identify the mechanical speed of an induction motor and use neural network speed estimator to better control motor speed based on the conventional vector control method. However, the competing control nature associated with the current loop is not solved, and thus, the improvement only in speed loop does not help to achieve the true decoupled control. Some research proposed a neurocontroller for the current loop control of the induction motor used a Lyapunov-based online learning algorithm and showed its benefit, but the computational requirement of online learning is a big burden. (See, for example, J. Restrepo, J. Viola, R. G. Harley, and T. G. Habetler, "Induction machine current loop neurocontroller employing a Lyapunov based training algorithm," in Proc. IEEE Power Eng. Soc. Gen. Meeting, Tampa, Fla., USA, April 2003, pp. 1-8; or J. Restrepo, B. Burton, R. G. Harley, and T. G. Habetler, "ANN based current control of a VSI fed AC machine using line coordinates," in Proc. 5th IEEE Int. Caracas Conf. Devices Circuits Syst., November 2004, pp. 225-229.)

In recent years, significant research work has been conducted in the area of dynamic programming (DP) for optimal control of nonlinear systems. Adaptive critic designs constitute a class of approximate dynamic programming (ADP) methods that use incremental optimization techniques combined with parametric structures that approximate the optimal cost and the control of a system. In G. K. Venayagamoorthy, R. G. Harley, and D. C. Wunsch, "Comparison of heuristic dynamic programming and dual heuristic programming adaptive critics for neurocontrol of a turbogenerator," IEEE Trans. Neural Netw., vol. 13, no. 3, pp. 764-773, May 2002, both heuristic dynamic programming and dual heuristic programming have been used to control a turbogenerator. In S. Li, M. Fairbank, D. C. Wunsch, and E. Alonso, "Vector control of a grid-connected rectifier/inverter using an artificial neural network," in Proc. IEEE World Congr. Comput. Intell., Brisbane, Australia, June 2012, pp. 1-7, an ADP-based neural network (NN) controller is trained and used to control a grid-connected converter system, which demonstrated an excellent performance compared to the conventional standard vector controller.

However, no known previous work discloses a current loop vector controller for a three-phase induction motor using an ADP-based NN. Therefore, what is desired are improved control systems for controlling three-phase induction motors. In particular, systems, methods and devices are desired for controlling three-phase induction motors using an ADP-based neural network.

SUMMARY

Methods, systems and devices are described herein that use artificial neural networks to control AC electric machines and motor drives, which enhances the performance, reliability and efficiency of the AC electric machines and motor drives.

Described herein is a NN-based vector control method for the induction motor. The disclosure includes an approach to implement optimal vector control for an induction motor by using an NN; a NN controller to substitute two decoupled proportional-integral (PI) controllers in current loop; and, a mechanism to train the NN controller by using a Levenberg-Marquardt (LM)+forward accumulation through time (FATT) algorithm.

Disclosed is a method for controlling a three-phase induction motor. The method comprises providing a pulse-width modulated ("PWM") converter operably connected between an electrical power source and the induction motor; providing a vector controller comprising a nested-loop structure, said nested-loop structure comprised of a faster inner current loop having an inner current loop controller and a slower outer speed and rotor flux loop having an outer speed and rotor flux loop controller; providing a neural network vector control system operably connected to the PWM converter, wherein the neural network vector control system comprises the inner current loop controller; providing one or more proportional-integral (PI) controllers, wherein the one or more PI controllers comprise the outer speed and rotor flux loop controller, wherein the outer speed and rotor flux loop generates d- and q-axis current references $i_{sd\_ref}$ and $i_{sq\_ref}$ used by the inner current loop controller; receiving, by the inner loop controller, d- and q-axis current references $i_{sd\_ref}$ and $i_{sq\_ref}$, a measured d-axis current, $i_{sd}$, and a measured q-axis current, $i_{sq}$; providing the neural network vector controller with input signals comprised of error signals between the measured d- and q-axis currents and the d- and q-axis current references and integrals of the error signals; training the neural network vector control system based on approximate dynamical programming; controlling the PWM converter, wherein the trained inner current loop neural network controller implements a control function based on the error signals between actual and reference d- and q-axis currents and integrals of the error signals by applying a voltage signal $V_{dq\_ref}$ to control the PWM inverter.

Optionally, the neural network vector control system may comprise two parts, an input preprocessing block and a multi-layer feed-forward network. The multi-layer feed-forward network may comprise one input layer of four input nodes, multiple hidden layers of multiple nodes each, and one output layer of two output nodes. Each of the nodes may be configured to implement a hyperbolic tangent function.

The method may comprise training the neural network vector control system by implementing a dynamic programming ("DP")-based training algorithm. The objective of the training may be to find an optimal trajectory of control action that minimizes the DP cost. The DP-based training algorithm may comprise a Levenberg-Marquardt (LM) algorithm plus a Forward Accumulation Through Time (FATT) Algorithm. The neural network vector control system is trained based on a cost function defined according to optimal control principles in dynamic programming.

Also disclosed herein is a system comprising a three-phase induction motor; and a control system for controlling the three-phase induction motor. The control system comprises a pulse-width modulated ("PWM") converter operably connected between an electrical power source and the induction motor; a vector controller comprising a nested-loop structure, said nested-loop structure comprised of a faster inner current loop having an inner current loop controller and a slower outer speed and rotor flux loop having an outer speed and rotor flux loop controller; a neural network vector control system operably connected to the PWM converter, wherein the neural network vector control system comprises the inner current loop controller; one or more proportional-integral (PI) controllers, wherein the one or more PI controllers comprise the outer speed and rotor flux loop controller, wherein the outer speed and rotor flux loop generates d- and q-axis current references $i_{sd\_ref}$ and $i_{sq\_ref}$ used by the inner current loop controller, wherein the inner loop controller receives the d- and q-axis current references $i_{sd\_ref}$ and $i_{sq\_ref}$, a measured d-axis current, $i_{sd}$, and a measured q-axis current, $i_{sq}$; wherein the neural network vector controller receives input signals comprised of error signals between the measured d- and q-axis currents and the d- and q-axis current references and integrals of the error signals; wherein the neural network vector control system is trained based on approximate dynamical programming; and wherein the PWM converter is controlled by the trained inner current loop neural network controller implementing a control function based on the error signals between actual and reference d- and q-axis currents and integrals of the error signals by applying a voltage signal $V_{dq\_ref}$ to control the PWM inverter.

Optionally, the neural network vector control system may comprise two parts, an input preprocessing block and a multi-layer feed-forward network. The multi-layer feed-forward network may comprise one input layer of four input nodes, multiple hidden layers of multiple nodes each, and one output layer of two output nodes. Each of the nodes may be configured to implement a hyperbolic tangent function.

The system may comprise training the neural network vector control system by implementing a dynamic programming ("DP")-based training algorithm. The objective of the training may be to find an optimal trajectory of control action that minimizes the DP cost. The DP-based training algorithm may comprise a Levenberg-Marquardt (LM) algorithm plus a Forward Accumulation Through Time (FATT) Algorithm. The neural network vector control system is trained based on a cost function defined according to optimal control principles in dynamic programming.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 10A-10C illustrate neural network vector control with new settings $R^*_r=3R_r$ in an induction motor where 10A shows speed, 10B shows torque and 10C shows stator dq currents;

DETAILED DESCRIPTION

Figure 1:
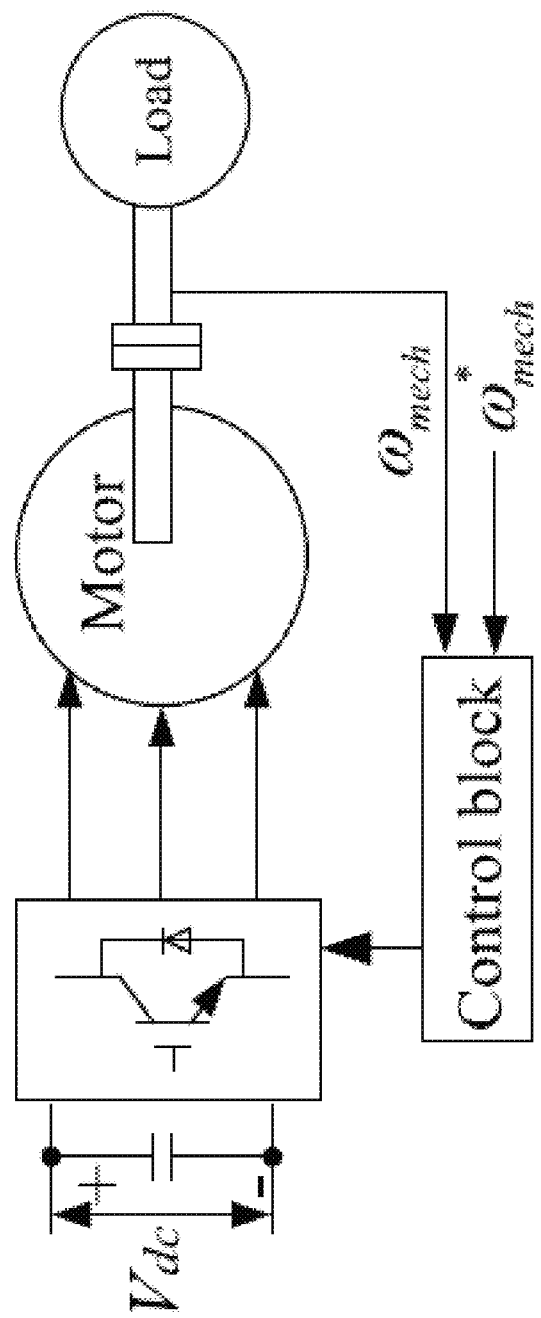
FIG. 1 shows a simple schematic of three-phase induction motor drive, in which a dc voltage source is on the left and the control block plays the role of regulating the motor speed through a voltage source pulse width modulation (PWM) converter.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

FIG. 1 shows a simple schematic of three-phase induction motor drive, in which a dc voltage source is on the left and the control block plays the role of regulating the motor speed through a voltage source pulse width modulation (PWM) converter. In the dq domain, the stator voltage equations is written as:

$$\begin{bmatrix} v_{sd} \\ v_{sq} \end{bmatrix} = R_s \begin{bmatrix} i_{sd} \\ i_{sq} \end{bmatrix} + \frac{d}{dt}\begin{bmatrix} \lambda_{sd} \\ \lambda_{sq} \end{bmatrix} + \omega_{sys}\begin{bmatrix} 0 & -1 \\ 1 & 0 \end{bmatrix}\begin{bmatrix} \lambda_{sd} \\ \lambda_{sq} \end{bmatrix} \quad (1)$$

where $R_s$ is the per phase resistance of the stator winding, $\omega_{sys}$ is the synchronous speed of the induction motor, and $v_{sd}$, $v_{sq}$, $i_{sd}$, $i_{sq}$, $\lambda_{sd}$, and $\lambda_{sq}$ are the d and q components of stator d-axis voltage, stator q-axis voltage, stator d-axis current, stator q-axis current, stator d-axis flux, and stator q-axis flux, respectively.

Using the rotor flux-oriented frame, that is rotor q-axis flux $\lambda_{rq}=0$, the rotor voltage equation is shown by:

$$\begin{bmatrix} 0 \\ 0 \end{bmatrix} = R_r \begin{bmatrix} i_{rd} \\ i_{rq} \end{bmatrix} + \frac{d}{dt}\begin{bmatrix} \lambda_{rd} \\ 0 \end{bmatrix} + \omega_{slip}\begin{bmatrix} 0 & -1 \\ 1 & 0 \end{bmatrix}\begin{bmatrix} \lambda_{rd} \\ 0 \end{bmatrix} \quad (2)$$

where $R_r$, $\omega_{slip}$, $i_{rd}$, $i_{rq}$, $\lambda_{rd}$, and $\lambda_{rq}$ stand for per-phase rotor resistance, rotor slip speed, rotor d-axis current, rotor q-axis current, rotor d-axis flux, and rotor q-axis flux, respectively. Especially, the rotor slip speed $\omega_{slip}$ equals the difference between the synchronous speed $\omega_{sys}$ and rotor speed $\omega_m$, e.g., $\omega_{slip}=\omega_{sys}-\omega_m$.

The flux linkage equation can be expressed as:

$$\begin{bmatrix} \lambda_{sd} \\ \lambda_{sq} \\ \lambda_{rd} \\ 0 \end{bmatrix} = \begin{bmatrix} L_s & 0 & L_m & 0 \\ 0 & L_s & 0 & L_m \\ L_m & 0 & L_r & 0 \\ 0 & L_m & 0 & L_r \end{bmatrix}\begin{bmatrix} i_{sd} \\ i_{sq} \\ i_{rd} \\ i_{rq} \end{bmatrix} \quad (3)$$

where $L_s$, $L_r$, and $L_m$ represent per-phase stator inductance, per-phase rotor inductance, and per-phase stator magnetizing inductance. Especially, $L_s=L_{\_s}+L_m$ and $L_r=L_{\_r}+L_m$. $L_{\_s}$ and $L_{\_r}$ refer to per-phase stator leakage inductance and per-phase rotor leakage inductance, respectively.

The induction motor model (1)-(3) can be rearranged into the standard state-space representation shown by:

$$\frac{d}{dt}\begin{bmatrix} i_{sd} \\ i_{sq} \\ i_{rd} \end{bmatrix} = \quad (4)$$

$$-\begin{bmatrix} L_s & 0 & L_m \\ 0 & L_s - \frac{L_m^2}{L_r} & 0 \\ L_m & 0 & L_r \end{bmatrix}^{-1} \begin{bmatrix} R_s & -\omega_{syn}\left(L_n - \frac{L_m^2}{L_r}\right) & 0 \\ \omega_{syn}L_s & R_s & \omega_{syn}L_m \\ \omega_r L_m & -R_r\frac{L_m}{L_r} & R_r + \omega_r L_r \end{bmatrix}$$

$$\begin{bmatrix} i_{sd} \\ i_{sq} \\ i_{rd} \end{bmatrix} + \begin{bmatrix} L_s & 0 & L_m \\ 0 & L_s - \frac{L_m^2}{L_r} & 0 \\ L_m & 0 & L_r \end{bmatrix}^{-1} \begin{bmatrix} v_{sd} \\ v_{sq} \\ 0 \end{bmatrix}.$$

Define $\vec{i}_{dqS}=[i_{sd}\ i_{sq}\ i_{rd}]^1$ and $\vec{v}_{dqS}=[v_{sd}\ v_{sq}\ 0]^1$. To implement recurrent neural network (RNN)-based digital controller, the continuous state-space model (4) needs to be transferred into the equivalent discrete model (5) through either a zero-order or first-order hold discrete equivalent mechanism:

$$\vec{i}_{dqS}(k+1) = F\vec{i}_{dqS}(k) + G\vec{v}_{dqS}(k) \quad (5)$$

where k is an integer time step, F is the system matrix, and G is the matrix associated with the control voltage. Note that $\vec{i}_{sdq}=[i_{sd}\ i_{sq}]^1$ are the state variables that needs to be controlled and $\vec{v}_{sdq}=[v_{sd}\ v_{sq}]^1$ are the control actions.

The standard vector controller has a nested-loop structure comprised of a faster inner current loop and a slower outer speed and rotor flux loop. A fast inner current loop is important to ensure high-quality ac drive of an induction motor. The outer speed and rotor flux loop generates d- and q-axis current references to the inner current-loop controller, while the inner current-loop controller implements the final control function by applying a voltage signal to the PWM inverter. The conventional control strategy of the current loop is developed by rewriting Equations (1)-(3) as:

$$v_{sd} = \underbrace{\left(R_s i_{sd} + \sigma L_s \frac{d}{dt}i_{sd}\right)}_{v'_{sd}} + \left(\frac{L_m}{L_r}\frac{d}{dt}\lambda_{rd} - \omega_{sys}\sigma L_s i_{sq}\right) \quad (6)$$

$$v_{sq} = \underbrace{\left(R_s i_{sq} + \sigma L_s \frac{d}{dt}i_{sq}\right)}_{v'_{sq}} + \left(\omega_{sys}\frac{L_m}{L_r}\lambda_{rd} + \omega_{sys}\sigma L_s i_{sd}\right) \quad (7)$$

where σ is the leakage factor of the induction machine and defined as $\sigma=1-(L_m)^2/L_sL_r$. Those items denoted as $v'_{sd}$ and $v'_{sq}$ are treated as the state equations between the input voltages and output currents for the d- and q-axis current loops and the other terms are regarded as compensation items. Therefore, the corresponding transfer function 1/(Rs+sqLs) is used to design the current-loop controller.

The design of speed loop is based on the following equations:

$$\frac{d}{dt}\omega_{mech} = \frac{T_{em}-T_L}{J_{eq}},\ T_{em} = \underbrace{\frac{p}{2}\frac{L_m^2}{L_r}}_{K_T}i^*_{sd}i_{sq} \quad (8)$$

where p means pole numbers of the motor, $i^*_{sd}$ is the reference value of $i_{sd}$, and $K_T$ is constant.

Figure 2:
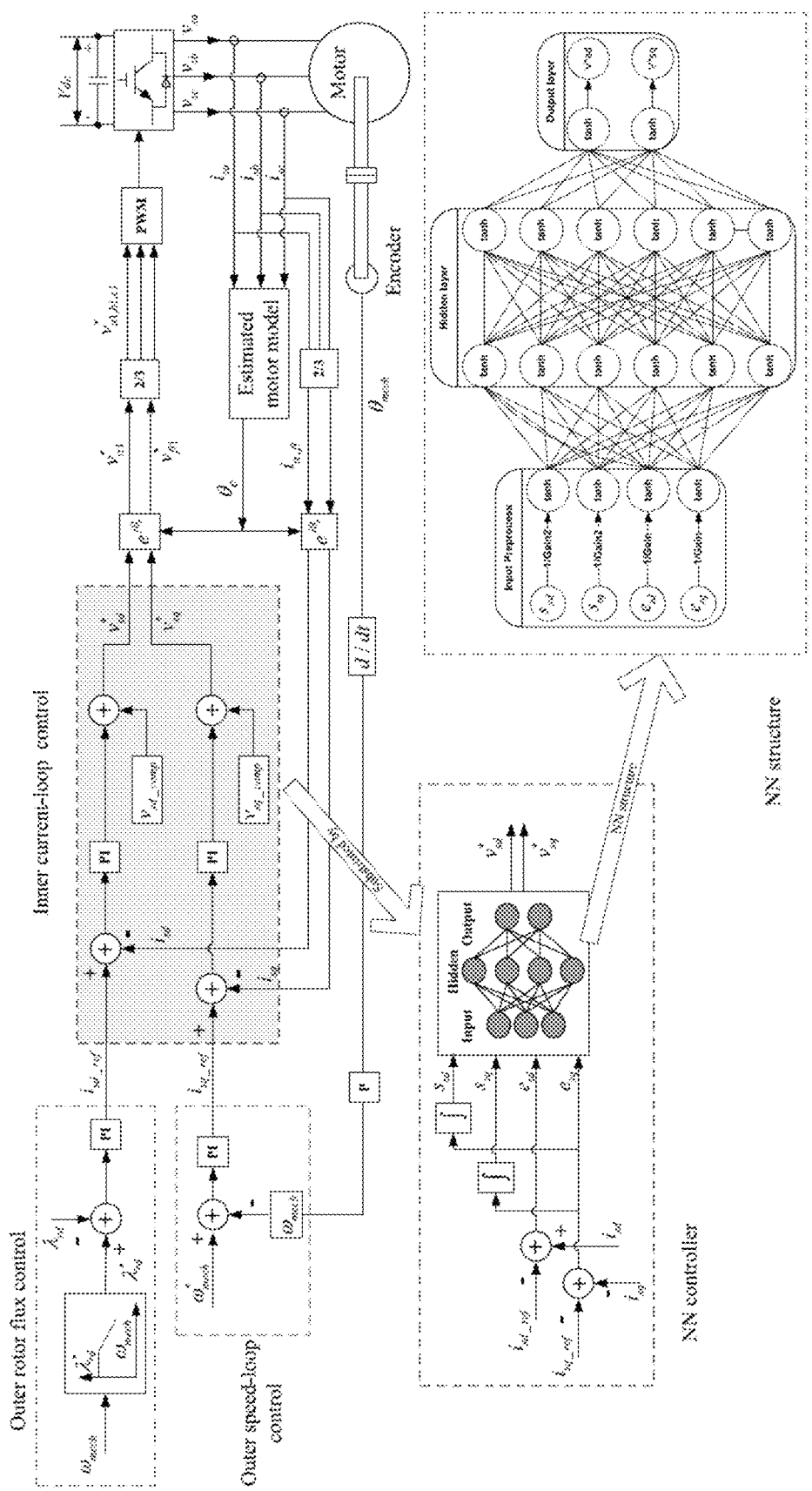
FIG. 2 shows a proposed NN vector control architecture for an induction motor.

A proposed NN vector control architecture for an induction motor is shown in FIG. 2. The NN implements the fast inner current-loop control function. Due to the universal function approximation property, NN vector control, unlike conventional vector control, has the ability to achieve true decoupled torque and flux control. The outer control loops still utilize PI controllers and q-axis loop is used for speed control as shown in FIG. 2.

The proposed current-loop NN controller as shown in FIG. 2 is comprised of two parts: input preprocessing block and a four-layer feed-forward network. To avoid input saturation, the inputs are regulated to the range [−1, 1] through a preprocessing procedure. The inputs to the feed-forward network are tan h($\vec{e}_{sdq}$/Gain) and tan h($\vec{s}_{sdq}$/Gain2) where $\vec{e}_{sdq}$ and $\vec{s}_{sdq}$ are error terms and integrals of the error terms. $\vec{e}_{sdq}$ is defined as $\vec{e}_{sdq}(k)=\vec{\iota}_{sdq}(k)-\vec{\iota}_{sdq\_ref}(k)$ and $\vec{s}_{sdq}(k)$ is calculated by:

$$\vec{s}_{sdq}(k) = \int_0^{kT_s} \vec{e}_{sdq}(t)dt \approx T_s \sum_{j=1}^{k} \frac{\vec{e}_{sdq}(j-1)+\vec{e}_{sdq}(j)}{2} \quad (9)$$

in which the trapezoid formula was used to compute the integral term $\vec{s}_{sdq}(k)$ and $\vec{e}_{sdq}(0)=0$.

The feed-forward network contains two hidden layers of six nodes each, and two output nodes, with hyperbolic tangent functions at all nodes. Two hidden layers were chosen to yield a stronger approximation ability. The selection of the number of neurons in each hidden layer was done through trial and error tests. Basically, six nodes in each hidden layer can give good enough results. Even though the feed-forward network in FIG. 2 does not have a feedback connection, the proposed NN current controller shown in FIG. 2 actually is a RNN because the current feedback signal generated by the system (4) acts as a recurrent network connection from the output of NN back to the input. A recurrent network is potentially more powerful than a feed-forward network and can exhibit temporal behavior, which may be particularly important for feedback control applications.

According to FIG. 2, the NN current-loop controller can be denoted as $R(\vec{e}_{sdq},\vec{s}_{sdq},\vec{\omega})$, which is a function of $\vec{e}_{sdq}$, $\vec{s}_{sdq}$, and network weights $\vec{\omega}$. As the ratio of the converter output voltage $\vec{v}_{sdq}$ to the outputs of the current loop controller $\vec{v}^*_{sdq}$ is the gain of the PWM, which is denoted as $k_{PWM}$, the control action $\vec{v}_{sdq}$ is then expressed by:

$$\vec{v}_{sdq}=k_{PWM}\vec{v}^*_{sdq}=k_{PWM}R(\vec{e}_{sdq},\vec{s}_{sdq},\vec{\omega}) \quad (10)$$

Training the Neural Network Controller

DP employs the principle of Bellman's optimality (see, R. E. Bellman, *Dynamic Programming*. Princeton, N.J., USA: Princeton Univ. Press, 1957, which is incorporated by reference) and is a very useful tool for solving optimization and optimal control problems. The DP cost function associated with the induction motor system is defined as:

$$C_{dp} = \sum_{k=j}^{\infty} \gamma^{k-j} U(\vec{e}_{sdq}(k)) \quad (11)$$

$$= \sum_{k=j}^{\infty} \gamma^{k-j} \sqrt{[i_{sd}(k)-i_{sd\_ref}(k)]^2+[i_{sq}(k)-i_{sq\_ref}(k)]^2}$$

where γ is a discount factor with 0<γ≤1 and j>0. U is called local cost or utility function. The function $C_{dp}$, depending on the initial time j>0 and the initial state $\vec{\iota}_{sdq}(j)$, is referred to as the cost-to-go of state $\vec{\iota}_{sdq}(j)$ of the DP problem.

The objective of the training is to find an optimal trajectory of control action $v_{dq1}$ that minimizes the DP cost $C_{dp}$ in (11).

One method of training the NN s by use of a Levenberg-Marquardt (LM) algorithm. An advantage of the LM algorithm is that is that it appears to be the fastest NN training algorithm, for a moderate number of network parameters. Also, LM usually can achieve better convergency performance than BPTT in training the RNN.

To implement LM training, the cost function defined in (11) needs to be rewritten in a sum-of-squares form. Consider the cost function $C_{dp}$ with γ=1, j=1 and k=1, . . . , N; then, it can be written in the form:

$$C_{dp} = \sum_{k=1}^{N} U(\vec{e}_{sdq}(k)) \xleftrightarrow{def\, v(k)=\sqrt{U(\vec{e}_{sdq}(k))}} \quad (12)$$

$$C_{dp} = \sum_{k=1}^{N} V^2(k)$$

and the gradient $$\frac{\partial C_{dp}}{\partial w}$$

can be written in a matrix product form:

$$\frac{\partial C_{dp}}{\partial \vec{\omega}} = \sum_{k=1}^{N} V(k)\frac{\partial V(k)}{\partial w} = 2J_v(\vec{\omega})^T V \quad (13)$$

In which, the Jacobian matrix $J_v(\vec{w})$ is:

$$J_v(\vec{\omega}) = \begin{bmatrix} \frac{\partial V(1)}{\partial w_1} & \cdots & \frac{\partial V(1)}{\partial w_M} \\ \vdots & \ddots & \vdots \\ \frac{\partial V(N)}{\partial w_1} & \cdots & \frac{\partial V(N)}{\partial w_M} \end{bmatrix}, V = \begin{bmatrix} V(1) \\ \vdots \\ V(N) \end{bmatrix}. \quad (14)$$

Therefore, the weights update by using LM for an NN controller can be expressed as:

$$\Delta\vec{\omega}=-[J_v(\vec{\omega})^T J_v(\vec{\omega})+\mu I]^{-1}J_v(\vec{\omega})^T V. \quad (15)$$

Forward Accumulation Through Time (FATT) Algorithm: The calculation of Jacobian matrix $J_v(w)$ needs to pass through the system equations (5). In order to find Jacobian matrix $J_v(\vec{w})$ efficiently, FATT is used for the induction motor, which incorporates the procedures of unrolling the system, calculating the derivatives of the Jacobian matrix, and calculating the DP cost into one single process for each training epoch. Algorithm 1, below, describes the whole algorithm.

$$\text{Denote } \overrightarrow{\phi_{sdq}}(k) = \sum_{j=1}^{k} \overrightarrow{i_{sdq}}(j) \text{ and } \frac{\partial \overrightarrow{\phi_{sdq}}(k)}{\partial \vec{w}} = \sum_{j=1}^{k} \frac{\partial \overrightarrow{i_{sdq}}(j)}{\partial \vec{w}}$$

in the algorithm.

---

Algorithm 1 FATT algorithm to calculate the Jacobian matrix and to accumlate DP cost.

1: $C_{DP} \leftarrow 0, \overrightarrow{e_{sdq}}(0) \leftarrow 0, \overrightarrow{s_{sdq}}(0) \leftarrow 0,$ $\frac{\partial \overrightarrow{i_{sdq}}(0)}{\partial \vec{w}} \leftarrow 0, \frac{\partial \overrightarrow{\phi_{sdq}}(0)}{\partial \vec{w}} \leftarrow 0$ 2: {Calculate the Jacobian matrix $J_v(\vec{w})$}
3: for k = 0 to N − 1 do
4: $\overrightarrow{v_{dq1}}(k) \leftarrow k_{PWM} R(\overrightarrow{e_{sdq}}(k), \overrightarrow{s_{sdq}}(k), \vec{w})$ 5: $\frac{\partial \overrightarrow{s_{sdq}}(k)}{\partial \vec{w}} \leftarrow T_s \left[ \frac{\partial \overrightarrow{\phi_{sdq}}(k)}{\partial \vec{w}} - \frac{1}{2} \frac{\partial \overrightarrow{i_{sdq}}(k)}{\partial \vec{w}} \right]$ 6: $\frac{\partial \overrightarrow{v_{dq1}}(k)}{\partial \vec{w}} \leftarrow k_{PWM}$ $\left[ \frac{\partial R(k)}{\partial \vec{w}} + \frac{\partial R(k)}{\partial \overrightarrow{e_{sdq}}(k)} \frac{\partial \overrightarrow{i_{sdq}}(k)}{\partial \vec{w}} + \frac{\partial R(k)}{\partial \overrightarrow{s_{sdq}}(k)} \frac{\partial \overrightarrow{s_{sdq}}(k)}{\partial \vec{w}} \right]$ 7: $\frac{\partial \overrightarrow{i_{dqS}}(k+1)}{\partial \vec{w}} \leftarrow F \frac{\partial \overrightarrow{i_{dqS}}(k)}{\partial \vec{w}} + G \frac{\partial \overrightarrow{u_{dqS}}(k+1)}{\partial \vec{w}}$ 8: $\frac{\partial \overrightarrow{i_{sdq}}(k+1)}{\partial \vec{w}} \leftarrow$ the first two terms of $\frac{\partial \overrightarrow{i_{dqS}}(k+1)}{\partial \vec{w}}$ 9: $\frac{\partial \overrightarrow{\phi_{sdq}}(k+1)}{\partial \vec{w}} \leftarrow \frac{\partial \overrightarrow{\phi_{sdq}}(k)}{\partial \vec{w}} + \frac{\partial \overrightarrow{i_{sdq}}(k+1)}{\partial \vec{w}}$ 10: $\overrightarrow{i_{dqS}}(k+1) \leftarrow F \overrightarrow{i_{dqS}}(k) + G \overrightarrow{u_{dqS}}(k)$
11: $\overrightarrow{e_{sdq}}(k+1) \leftarrow \overrightarrow{i_{sdq}}(k+1) - \overrightarrow{i_{sdq\_ref}}(k+1)$ 12: $\overrightarrow{s_{sdq}}(k+1) \leftarrow \overrightarrow{s_{sdq}}(k) + \frac{T_s}{2}[\overrightarrow{e_{sdq}}(k) + \overrightarrow{e_{sdq}}(k+1)]$ 13: $C_{DP} \leftarrow C_{DP} + U(\overrightarrow{e_{sdq}}(k+1))$
{accumulate DP cost}

14: $\frac{\partial \vec{V}(k+1)}{\partial \vec{w}} \leftarrow \frac{\partial \vec{V}(k+1)}{\partial \overrightarrow{e_{sdq}}(k+1)} \frac{\partial \overrightarrow{i_{sdq}}(k+1)}{\partial \vec{w}}$ 15: the (k + 1)th row of $J(\vec{w}) \leftarrow \frac{\partial \vec{V}(k+1)}{\partial \vec{w}}$ 16: end for
17: {On exit, the Jacobian matrix $J_v(\vec{w})$ is finished for the whole trajectory.}

---

Figure 3:
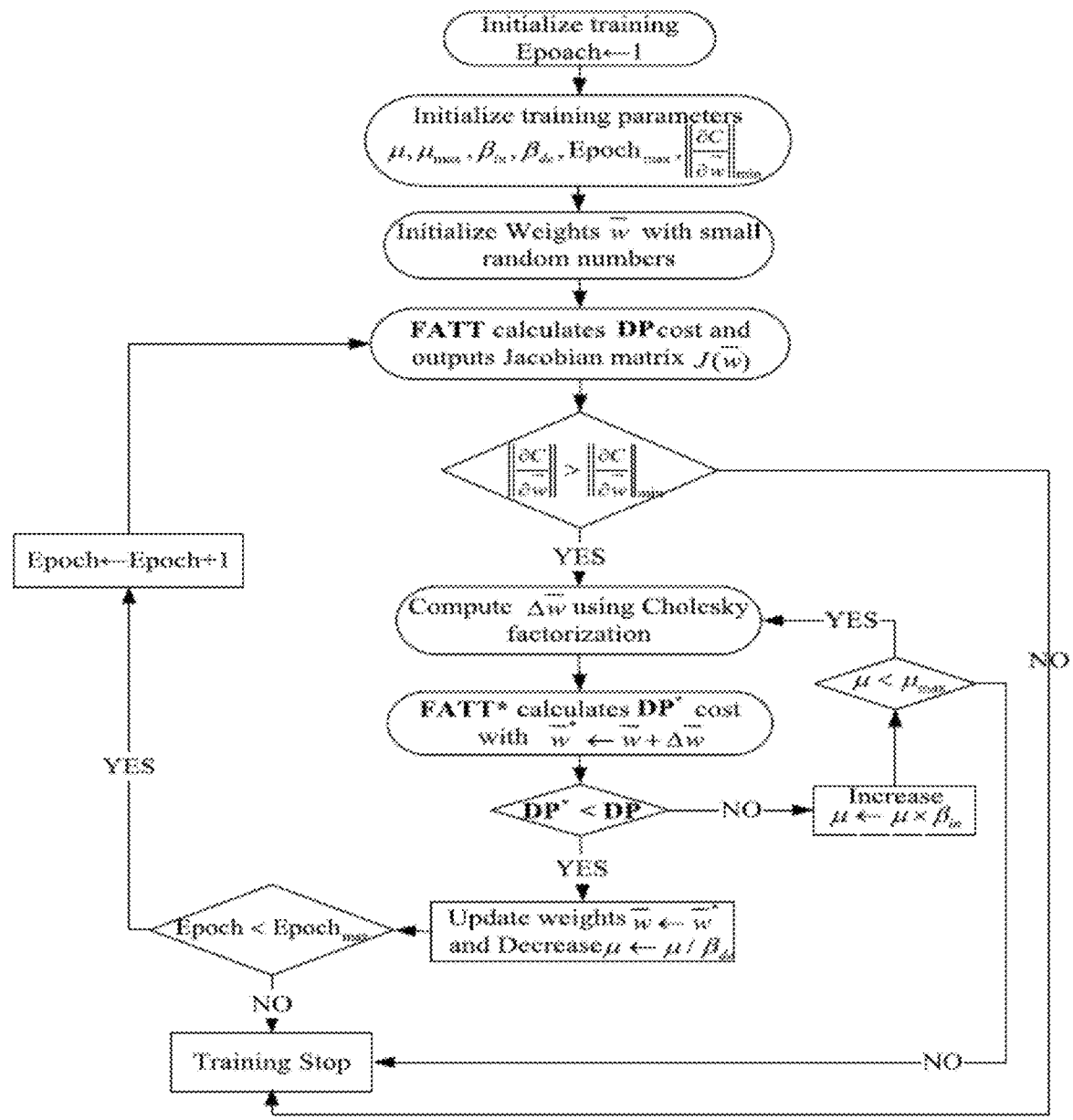
FIG. 3 is a flowchart that presents the process of LM algorithm for training an NN controller and also demonstrates how to adjust μ dynamically to ensure that the training follows the decreasing direction of the DP cost function.

Combination of LM+FATT Algorithms: FIG. 3 presents the process of LM algorithm for training an NN controller and also demonstrates how to adjust μ dynamically to ensure that the training follows the decreasing direction of the DP cost function. FIG. 3 illustrates a LM+FATT algorithm for NN controller training. μmax stands for maximum μ, $\beta_{de}$ and $\beta_{in}$ signify the decreasing and increasing factors, respectively, Epoch$_{max}$ represents the maximum number of training epochs, $\|\partial C_{dp}/\partial \vec{w}\|_{min}$ denotes the norm of the minimum gradient. The weights update in (15) is handled by Cholesky factorization, which is roughly twice as efficient as the LU decomposition for solving systems of linear equations. The training stops when the training epoch reaches a maximum acceptable value Epoch$_{max}$, μ is larger than $\mu_{max}$, and the gradient is smaller than the predefined minimum acceptable value $\|\partial C_{dp}/\partial \vec{w}\|_{min}$.

An exemplary training implementation is described herein. Table I, below, specifies the parameters of a three-phase induction motor, which were used in NN training. Besides the LM+FATT algorithm described above, the following policies were also used in the training:

1) l trajectories were used to train the RNN. l was chosen as 10 in this example.

2) The initial current state $\overrightarrow{i_{sdq}}(0)$ for each trajectory was generated randomly.

3) The stator dq reference currents $\overrightarrow{i_{sdq\_ref}}$ for each trajectory were generated randomly and changed every 0.1 s.

4) The initial weights $\vec{\omega}$ of the RNN were generated randomly.

5) The sampling time was chosen as Ts=0.1 ms and the duration of each trajectory was set as 1 s.

TABLE I

"TEST" INDUCTION MOTOR PARAMETERS IN SIMULATION

| Symbol | Quantity | Value | Unit |
|---|---|---|---|
| $V_g$ | induction motor rated voltage (rms) | 460 | V |
| $J_{eq}$ | inertia | 0.025 | kg · m² |
| p | pole pairs | 4 | |
| $R_s$ | per-phase stator resistance | 1.77 | Ω |
| $R_r$ | per-phase rotor resistance | 1.34 | Ω |
| $L_{ls}$ | per-phase stator leakage inductance | 13.9 | mH |
| $L_{lr}$ | per-phase rotor leakage inductance | 12.1 | mH |
| $L_m$ | per-phase magnetizing inductance | 368.7 | mH |

Figure 4:
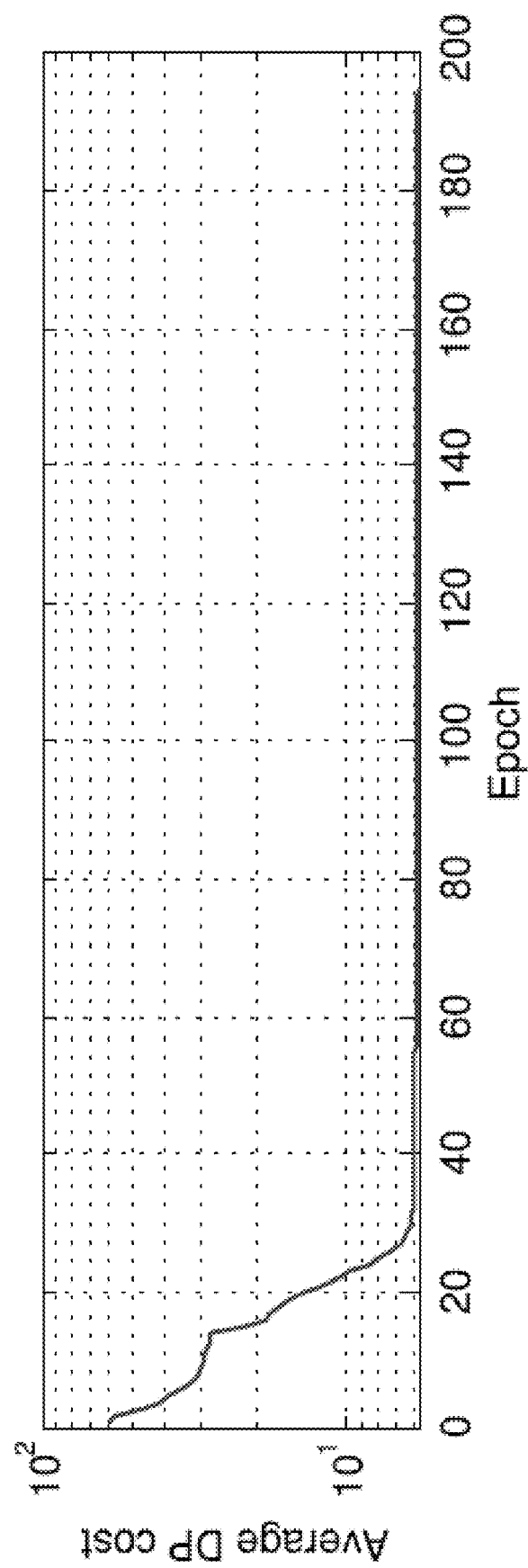
FIG. 4 shows a learning curve for a successful training of a NN controller.

FIG. 4 shows the learning curve for a successful training of the NN controller. The average DP cost per trajectory drops to a small value very quickly within 100 iterations and is stabilized at this value, demonstrating a good convergence result of the LM training algorithm.

Figure 5:
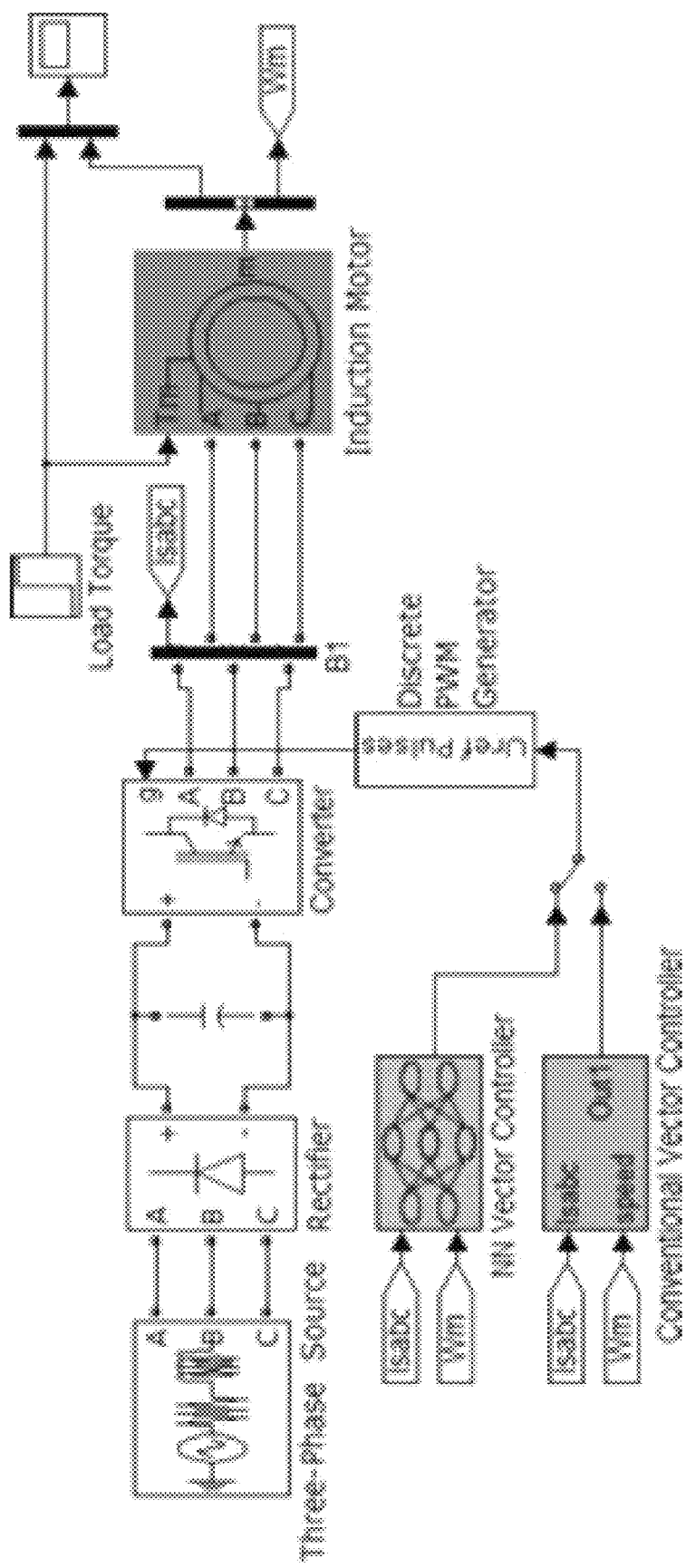
FIG. 5 illustrates a Simulink model of a three-phase induction motor drive system.

To evaluate the trained NN controller, integrated transient simulation system of a three-phase induction motor drive system was developed by using SimPowerSystems in MATLAB; see FIG. 5.

Figure 6:
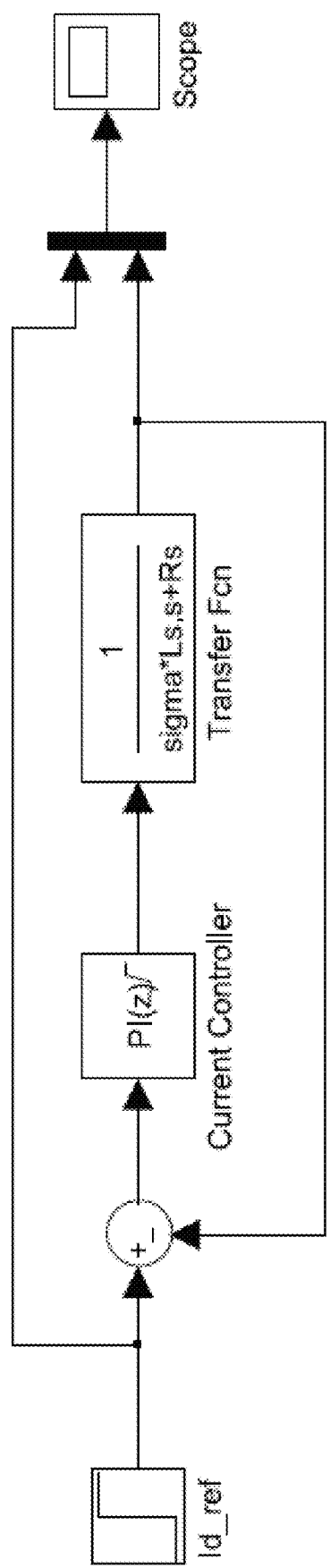
FIG. 6 illustrates a block diagram for tuning a current-loop PI controller.

The PI parameters of both current-loop and speed-loop controllers for the conventional vector control method were tuned by using the proportional-integral-derivative (PID) tuner function within the PID controller block in MATLAB. FIG. 6 shows the closed-loop Simulink model used to tune the current-loop PI parameters. The transfer function in FIG. 6 is $1/(R_s+s\sigma L_s)$ corresponding to Equations (6) and (7). For the current-loop controller, phase margin was set as 60° and the bandwidth was chosen as 2000 rad/s, which tends to yield the best results considering the PWM saturation constraints. For the speed-loop controller, the corresponding transfer function is $1/(K_T sJ_{eq})$ corresponding to Equation (8). As fast response is not required for the speed-loop controller, the crossover frequency was set as 20 rad/s and phase margins was also set as 60°. If not specified, $T_s$=0.1 ms was used in all simulation models as described herein and the switching frequency was chosen as fs=6000 Hz.

Figure 7A:
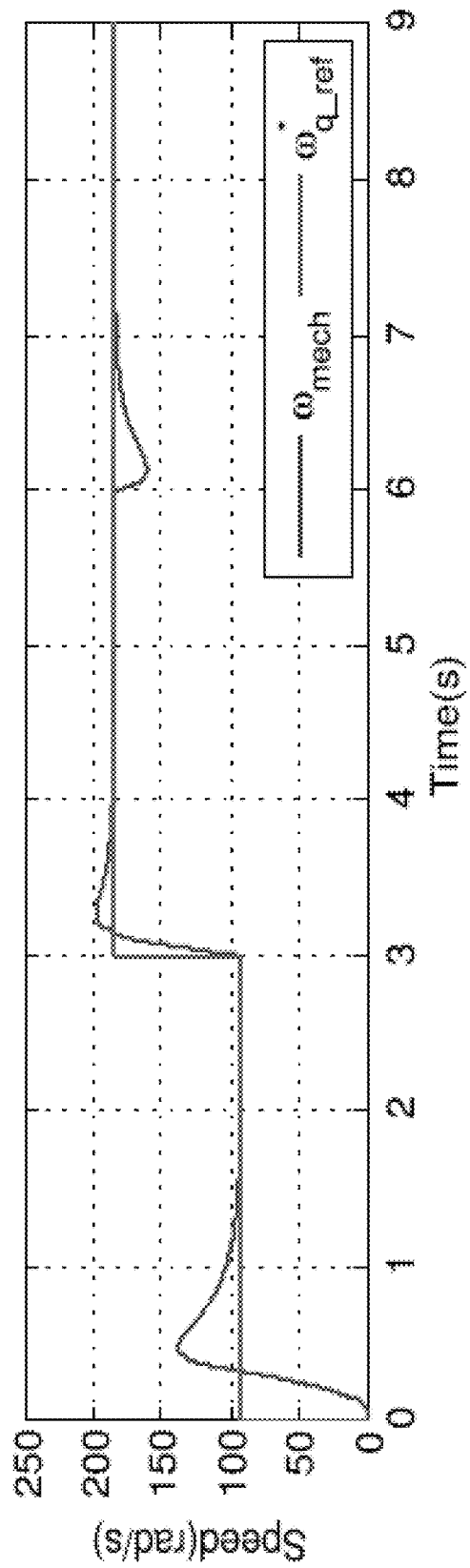
FIGS. 7A-7C illustrate conventional vector control in an induction motor where 7A shows speed, 7B shows torque and 7C shows stator dq currents.
Figure 7B:
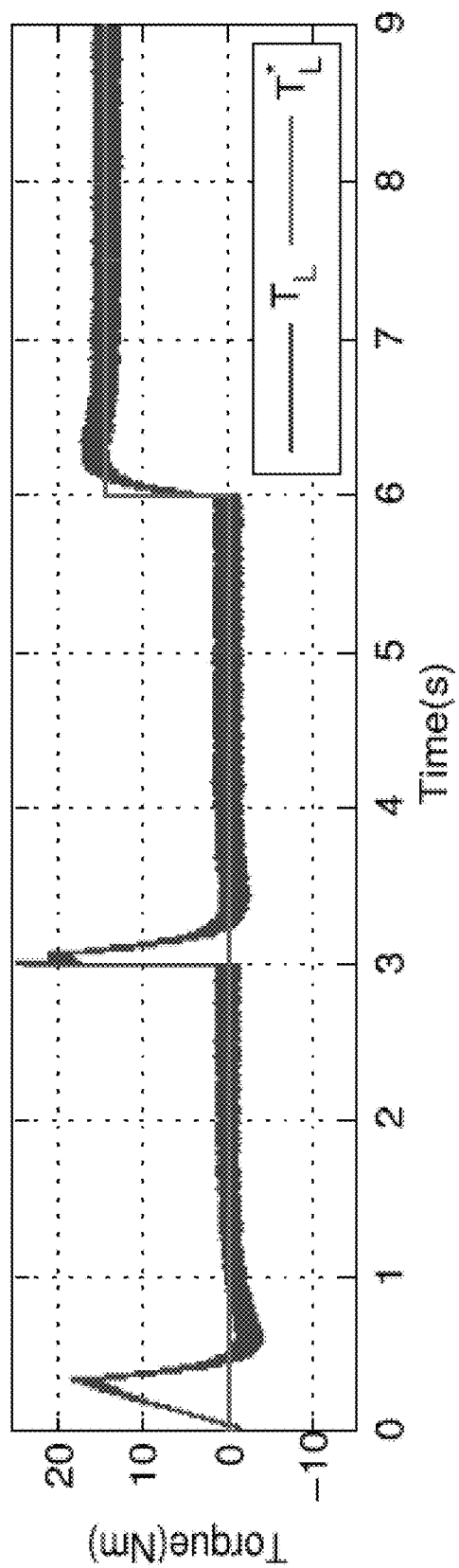
Figure 7C:
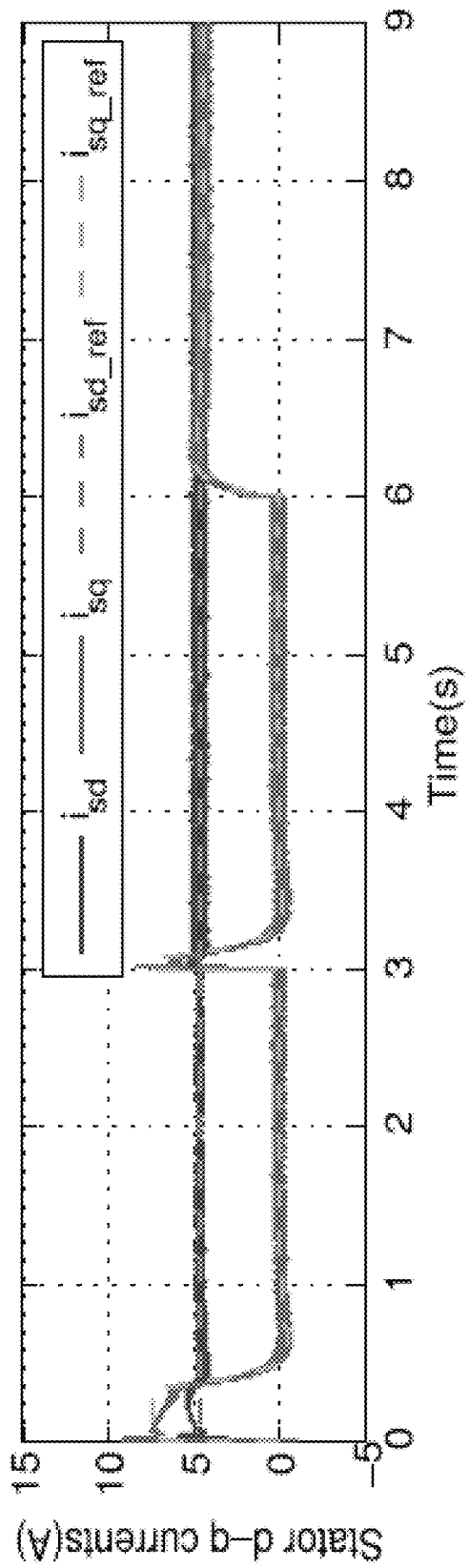
Figure 8A:
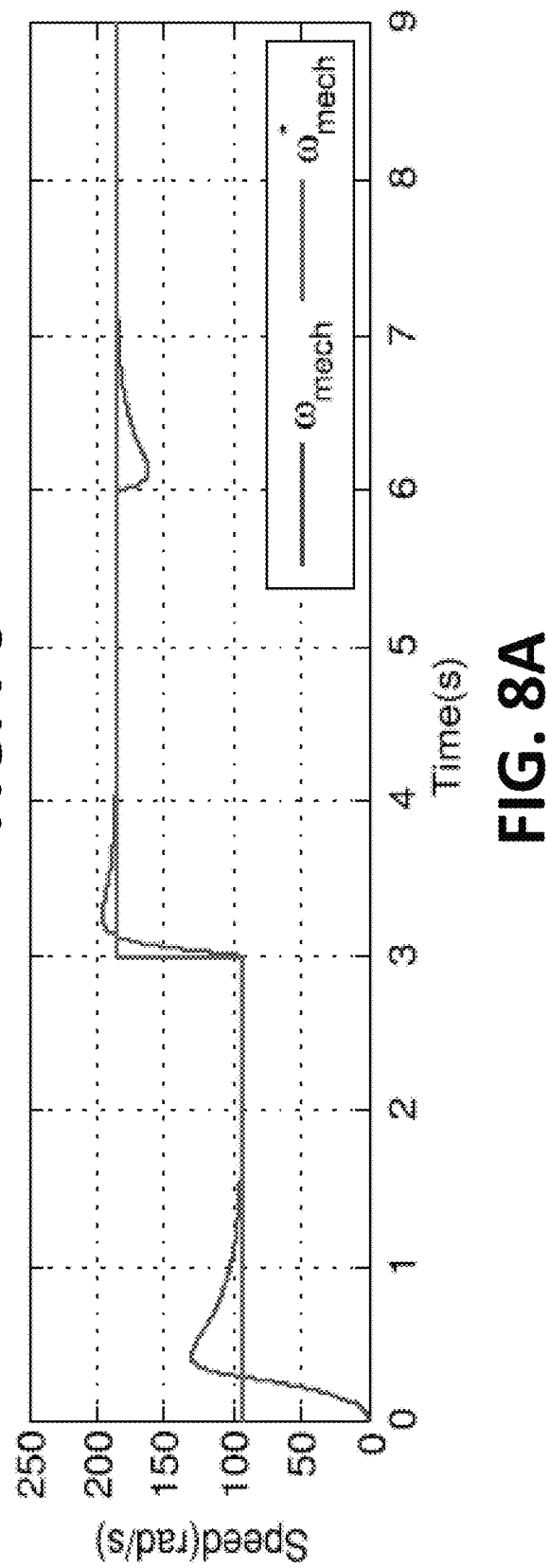
FIGS. 8A-8C illustrate neural network vector control in an induction motor where 8A shows speed, 8B shows torque and 8C shows stator dq currents.
Figure 8B:
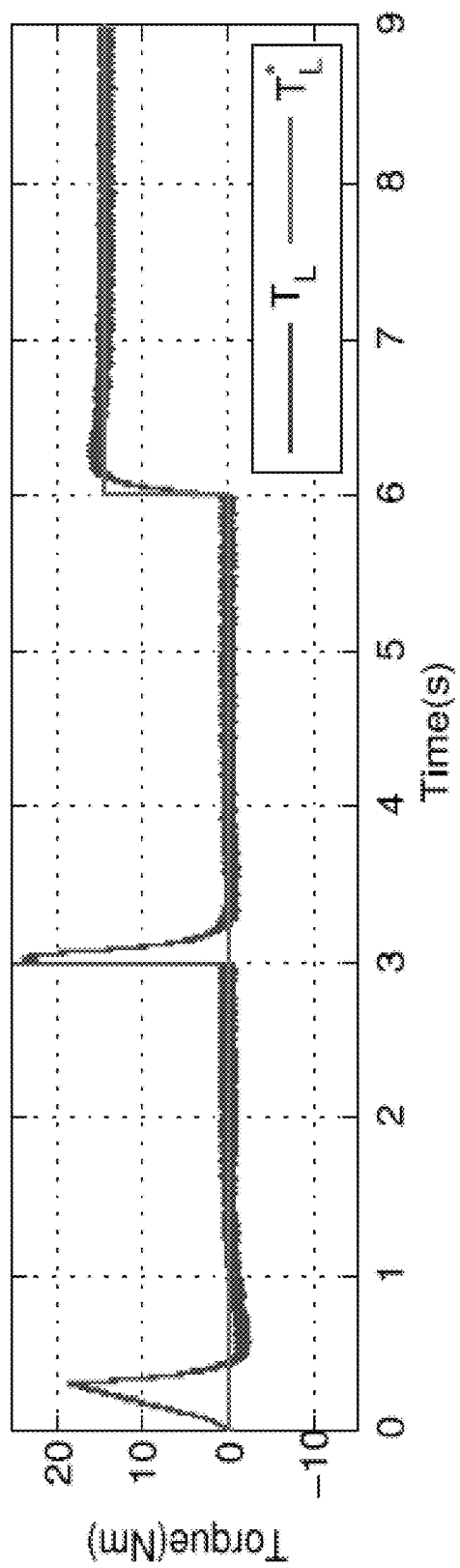
Figure 8C:
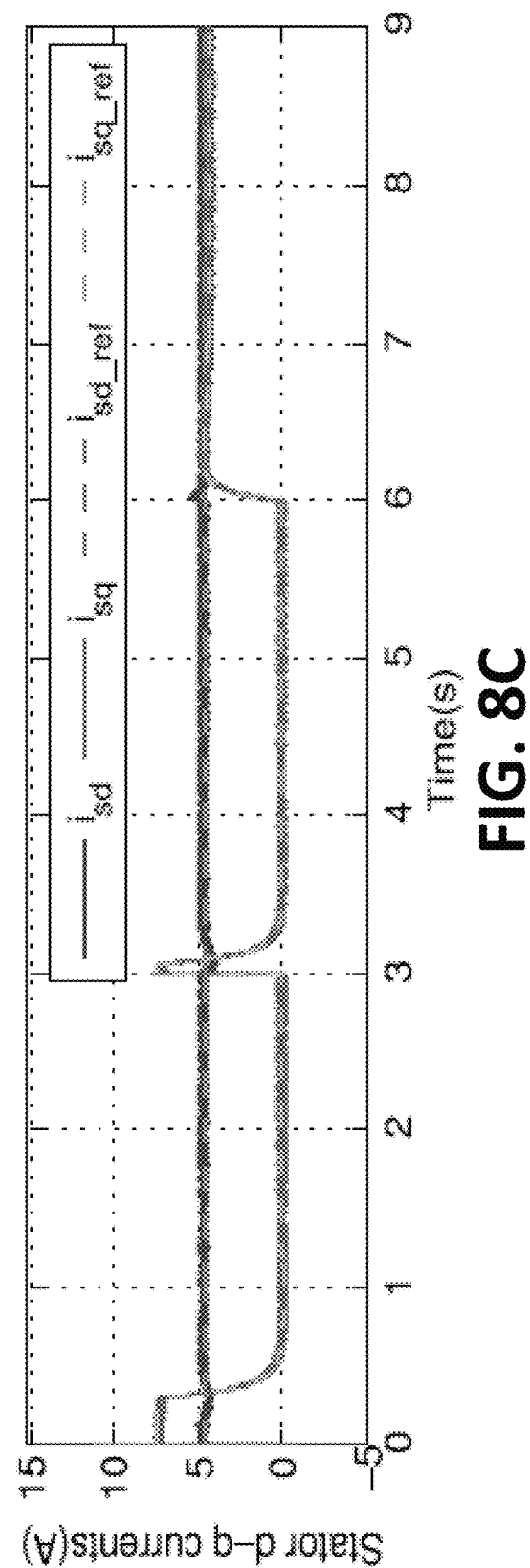

FIGS. 7A-7C show the tracking reference performance under the conventional vector control and FIGS. 8A-8C give the corresponding performance under the novel NN vector control.

During the test, no load torque was applied at the beginning and certain load torque was added at time t=6 s [see FIGS. 7(b) and 8(b)]. For speed reference tracking, although the same speed PI controller was used for both NN vector control [see FIG. 7(a)] and conventional vector control [see FIG. 8(a)], the NN controller still responses a little bit faster than the conventional controller. For stator dq current comparison [see FIGS. 7(c) and 8(c)] and torque comparison [see FIGS. 7(b) and 8(b)], the NN vector control provides less current oscillations than the conventional vector control.

Figure 9A:
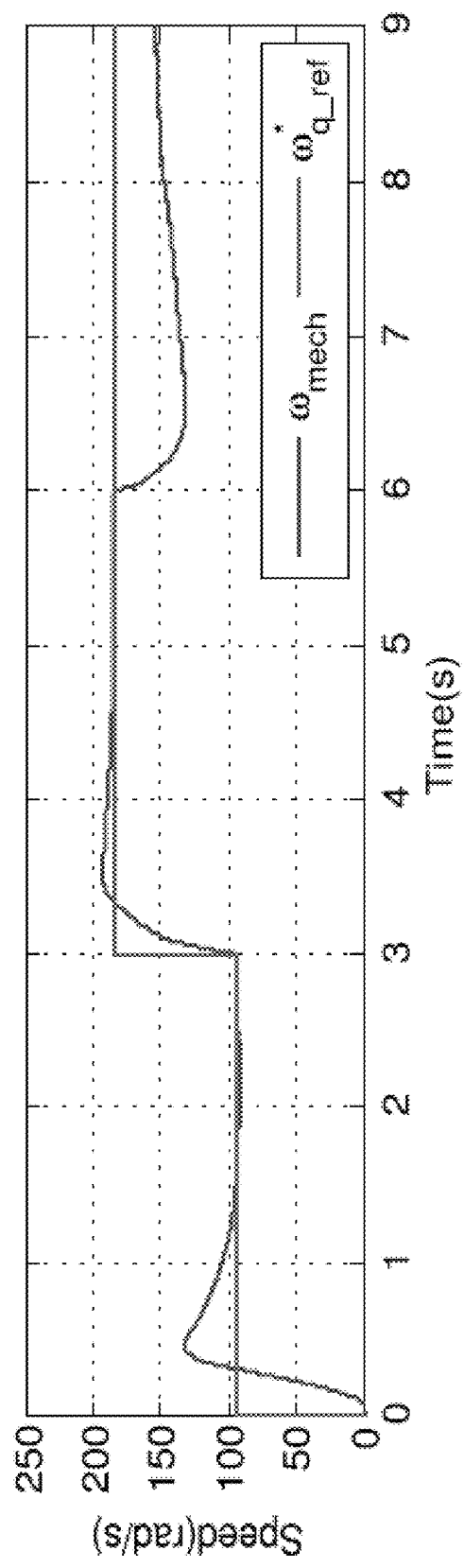
FIGS. 9A-9C illustrate conventional vector control with new settings $R^*_r=3R_r$ in an induction motor where 9A shows speed, 9B shows torque and 9C shows stator dq currents.
Figure 9B:
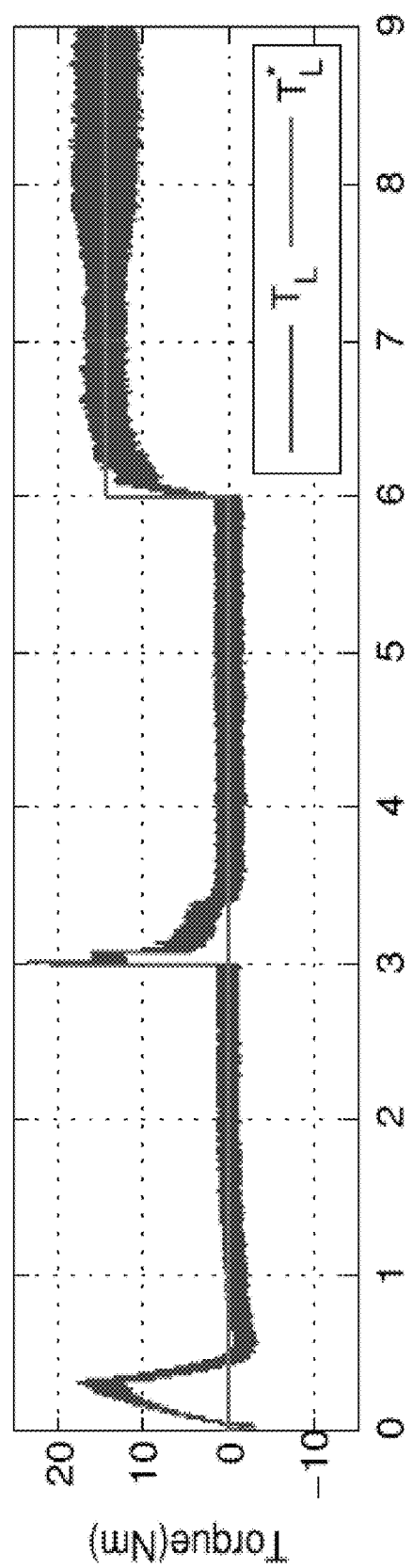
Figure 9C:
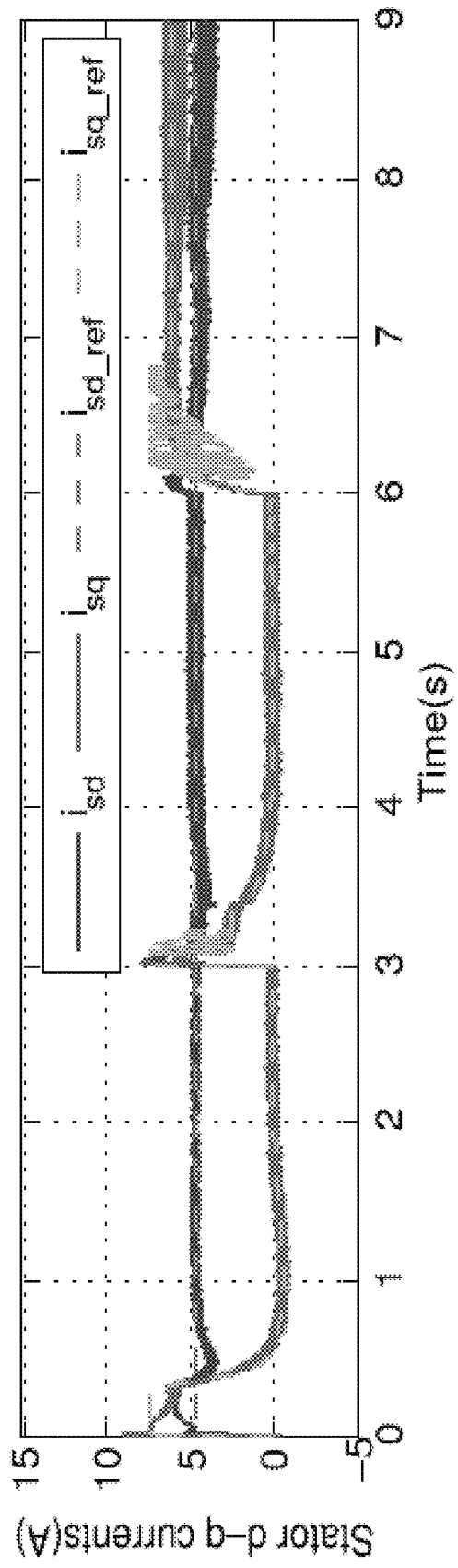
Figure 10A:
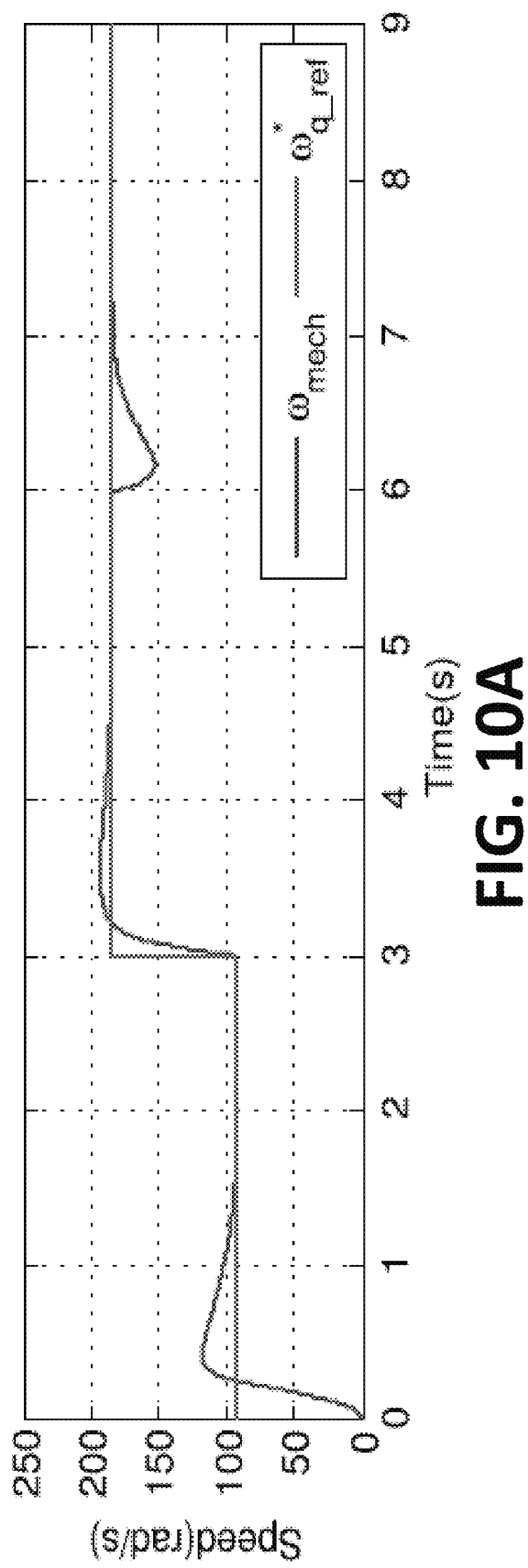

For vector control of the induction motor (e.g., FIG. 2), an estimated induction model is used to estimate the rotor position. However, in practice, the estimated motor parameters may deviate from its nominal values. This is particular true for the rotor time constant $\tau_r=L_r/R_r$, which mainly depends on rotor resistance that increases significantly as the rotor heats up. The variation of rotor resistance may be up to 100% and can hardly be recovered using thermal models and temperature sensors. This incorrect estimation will possibly cause a steady-state error using conventional vector control. Thus, an examination was performed to evaluate the NN vector control under incorrect parameter estimation condition. In the examination, we chose an extreme condition and the rotor resistance was set as $R^*_r=3R_r$ with all the other parameters kept unchanged. FIGS. 9 and 10 show the examination results of the conventional vector control and the NN vector control, respectively.

The performance results demonstrated great advantages of the NN vector control over the conventional vector control. When certain load torque was applied to the induction motor, there was an obvious steady-state error in tracking the speed reference under conventional vector control [see FIG. 9A], while the NN vector control still performed very well [see FIG. 10A]. Further, the NN vector control [see FIG. 10B] showed less torque oscillations than the conventional vector control [see FIG. 9B]. The stator dq current waveform revealed the reason why NN vector control can still perform well. The NN vector control can better overcome the competing control problem and achieve the optimal d- and q-axis current control to meet the motor drive needs even under large motor parameter deviation conditions. This examination demonstrated an important feature of the proposed NN vector control that it can tolerate a wide range of system parameter change. As the neural network has adaptive and leaning abilities, thus it can provide better performance when facing uncertainties, e.g., rotor resistance changes. In addition, the training of the proposed NN is designed to approximate optimal control, which further tends to yield better performance when facing system parameter changes. The robustness of the NN controller is also demonstrated in other vector control applications.

EXAMPLES

Hardware Experiment Validation
Experiment Setup

Figure 11:
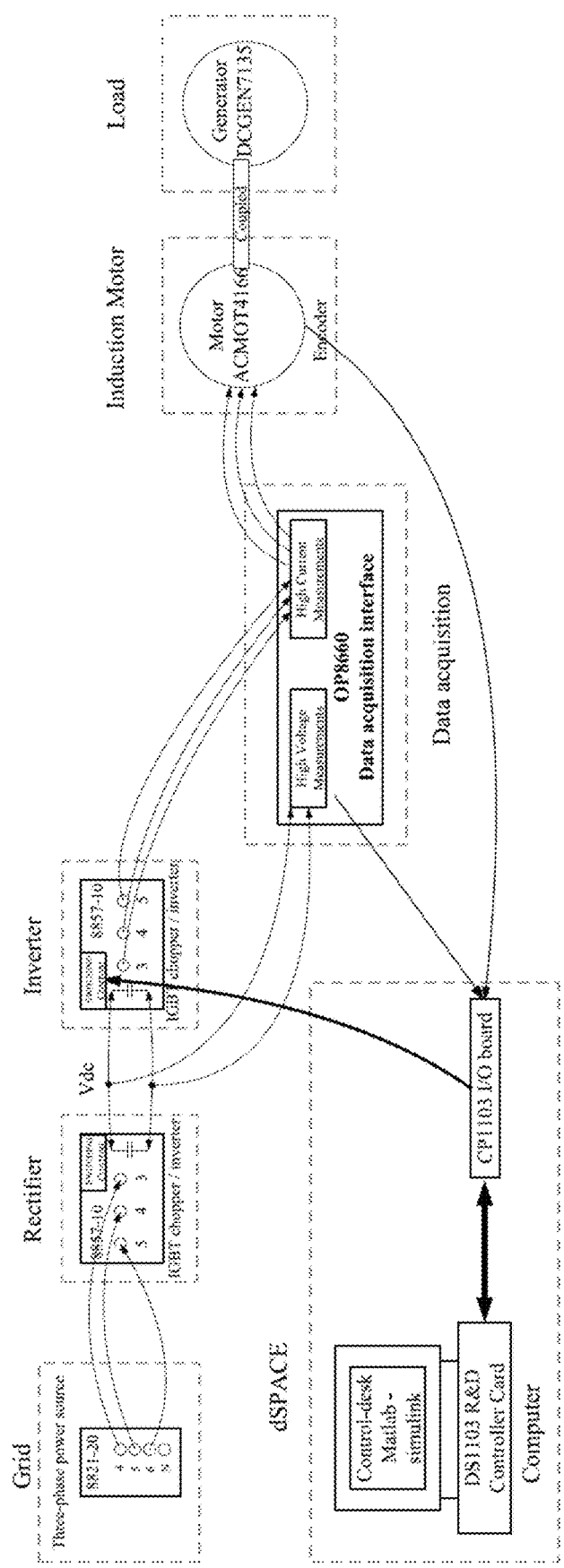
FIG. 11 illustrates a schematic of an induction motor drive experiment.
Figure 12:
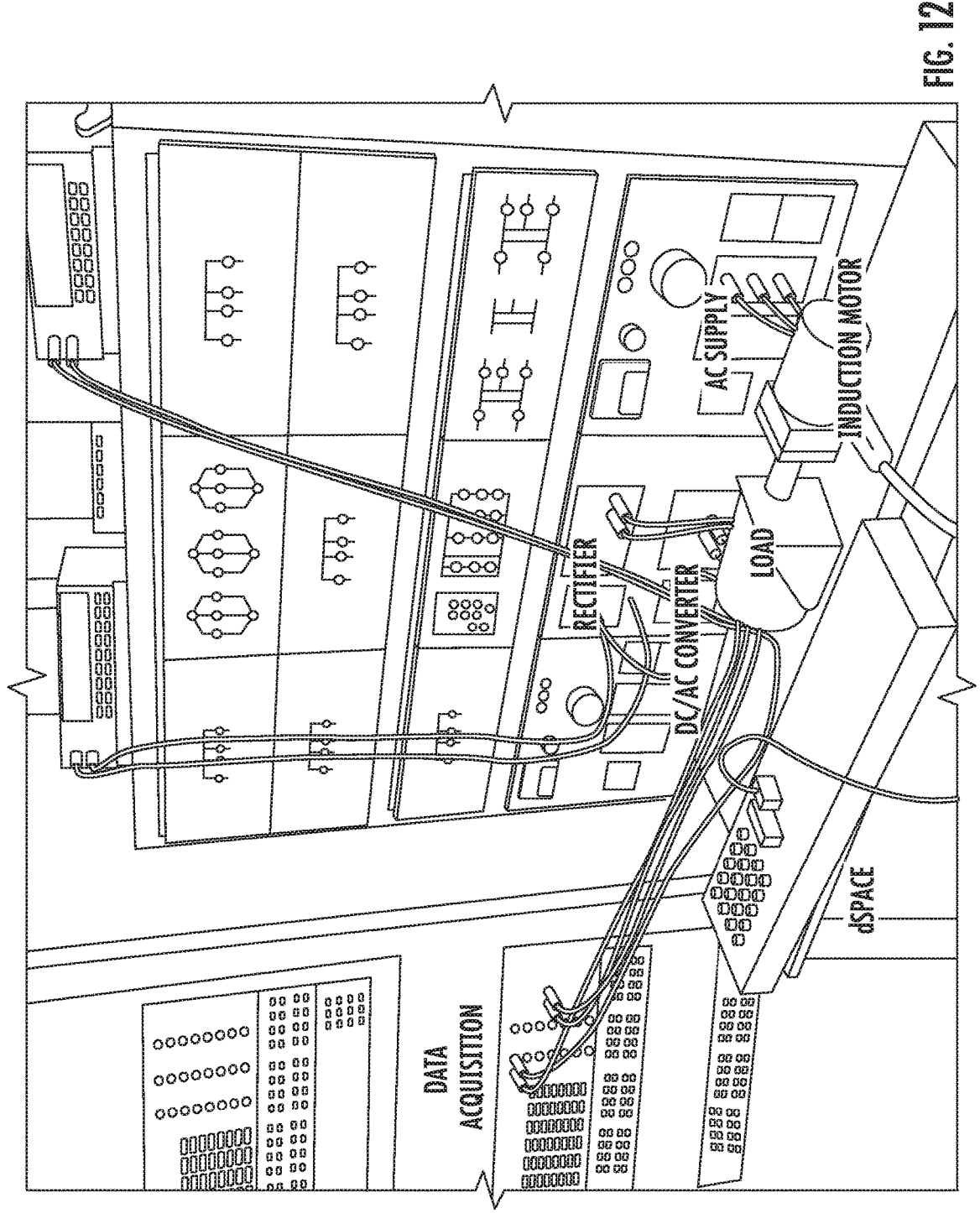
FIG. 12 is a photograph that shows the hardware testing and control systems during an experiment of aspects of the present invention.
Figure 13A:
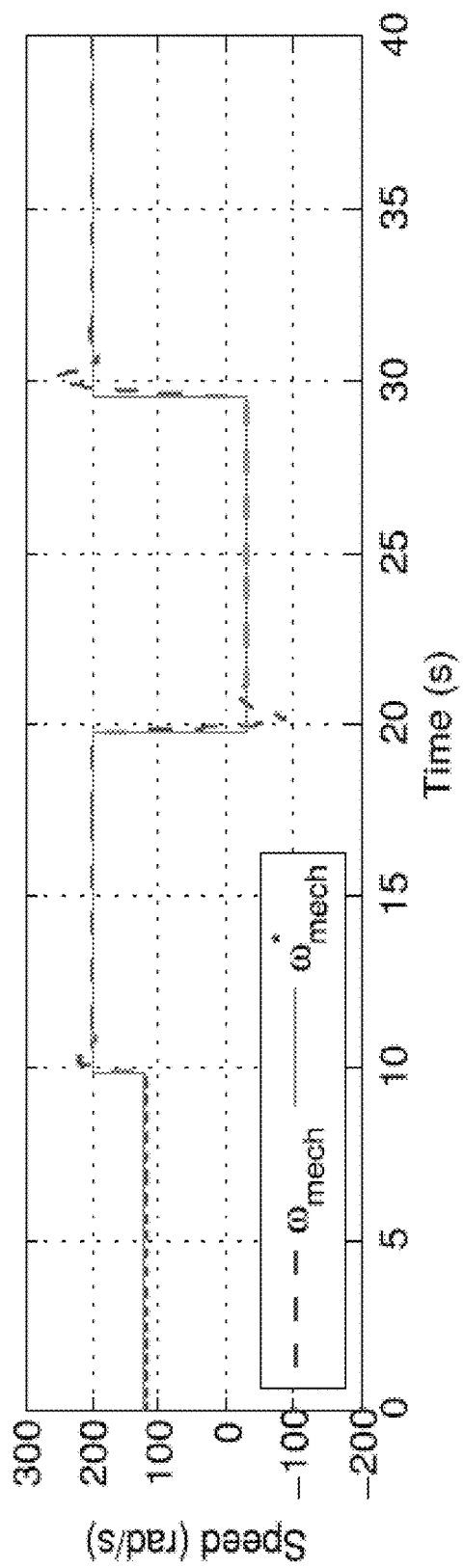
FIGS. 13A-13D illustrate conventional vector control of an induction motor during an induction motor drive experiment with $T_s=0.5$ ms and $f_s=6$ kHz where 13A shows speed, 13B shows stator d-axis current, 13C shows stator q-axis currents and 13D shows three-phase currents.
Figure 13B:
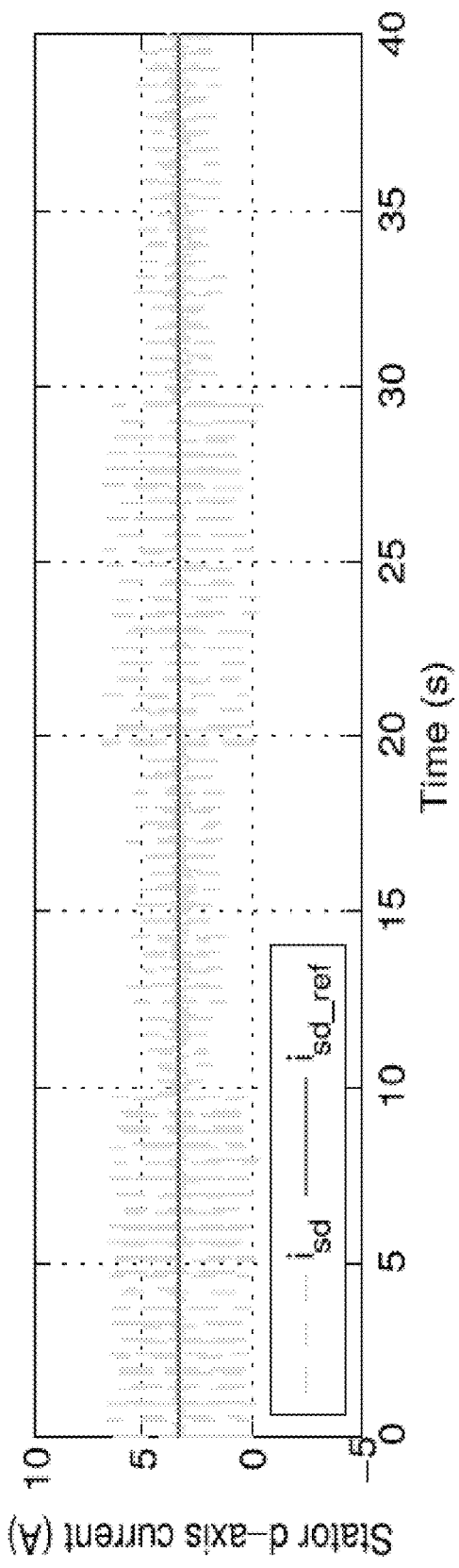
Figure 13C:
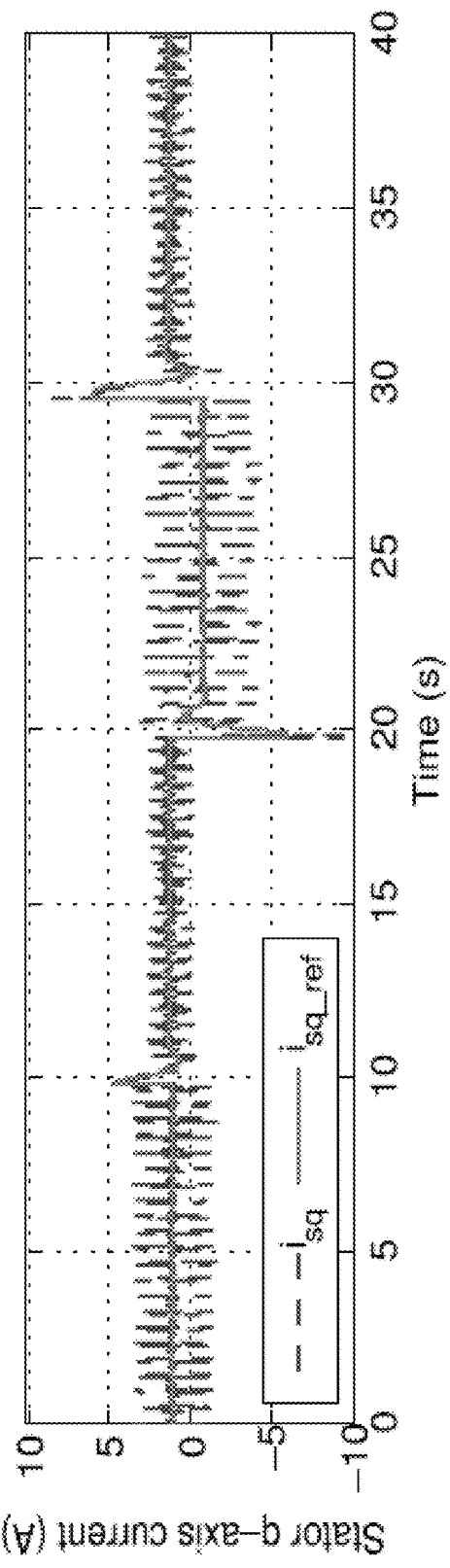
Figure 13D:
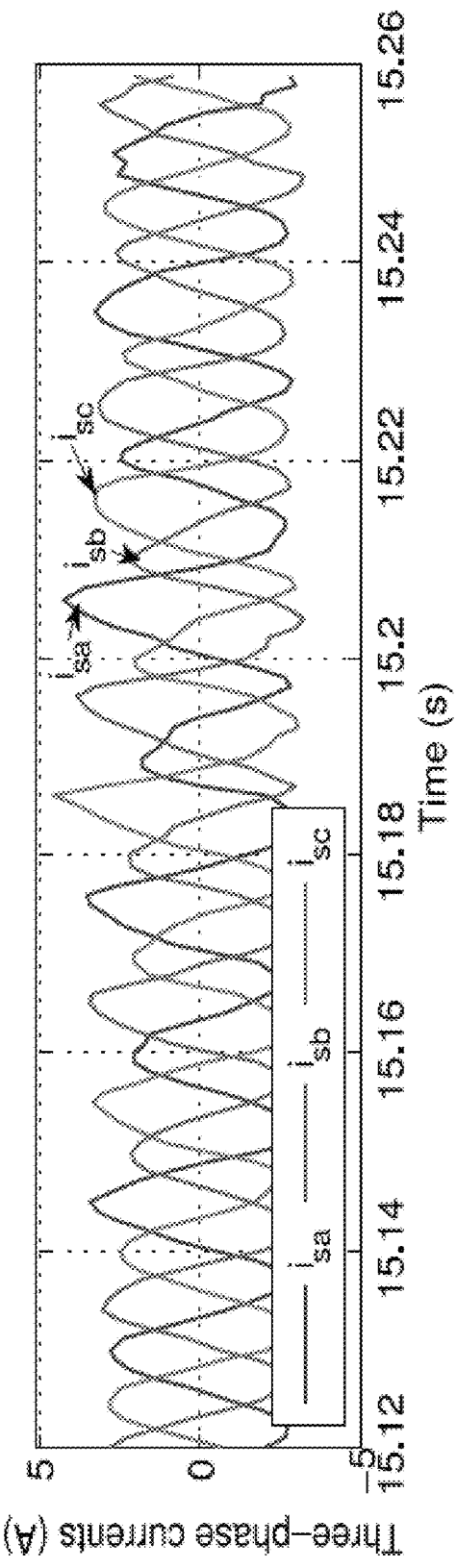
Figure 14A:
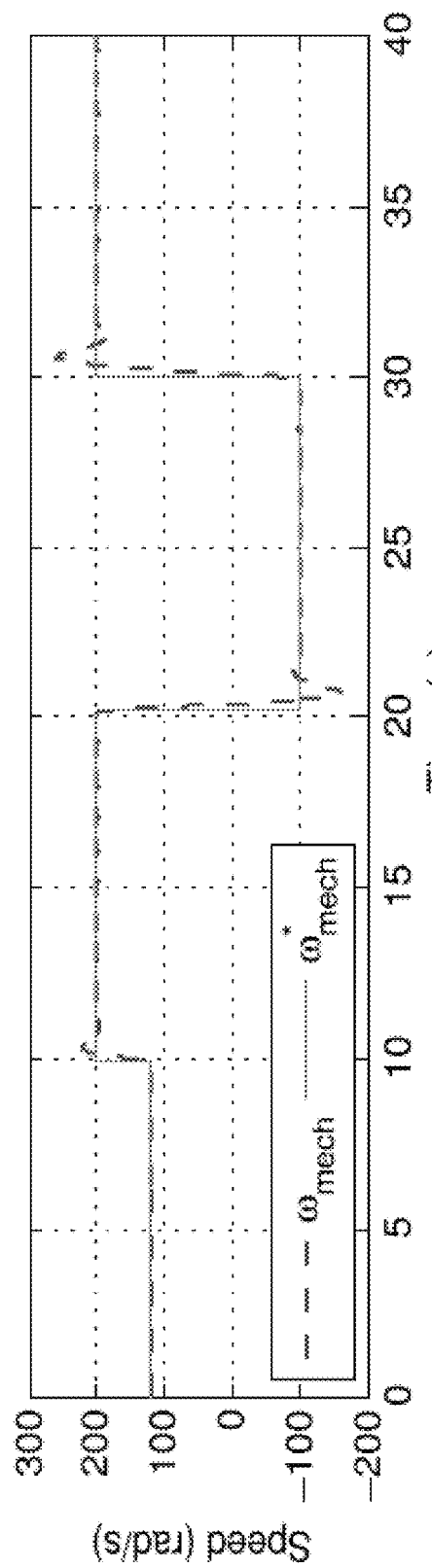
FIGS. 14A-14D illustrate NN vector control of an induction motor during an induction motor drive experiment with $T_s$=0.5 ms and $f_s$=6 kHz where 14A shows speed, 14B shows stator d-axis current, 14C shows stator q-axis currents and 14D shows three-phase currents.
Figure 14B:
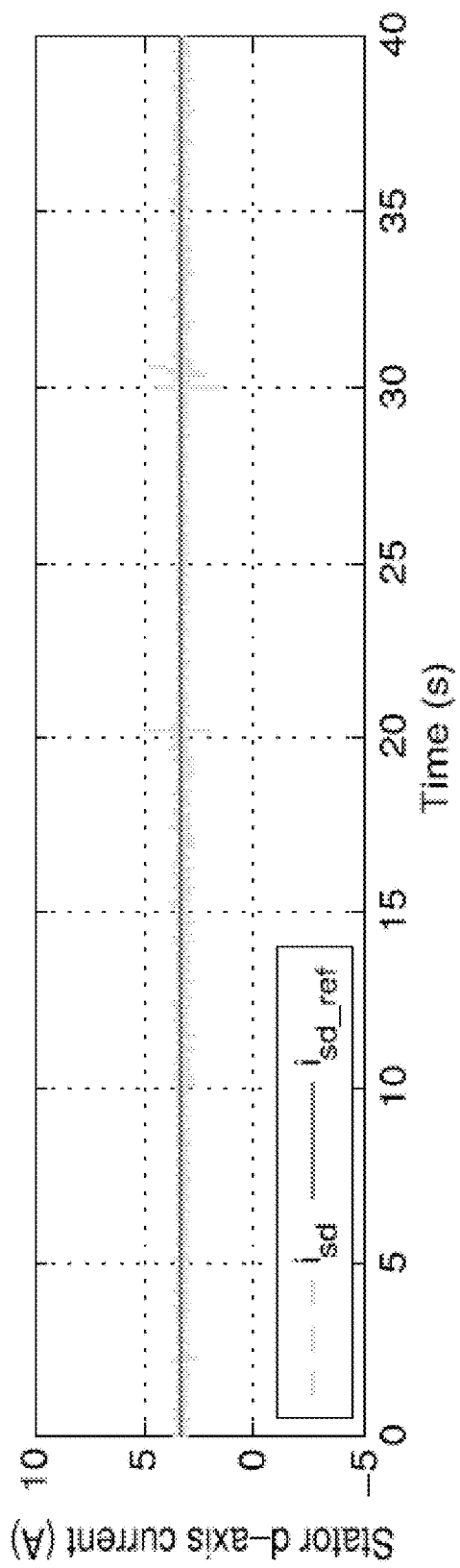
Figure 14C:
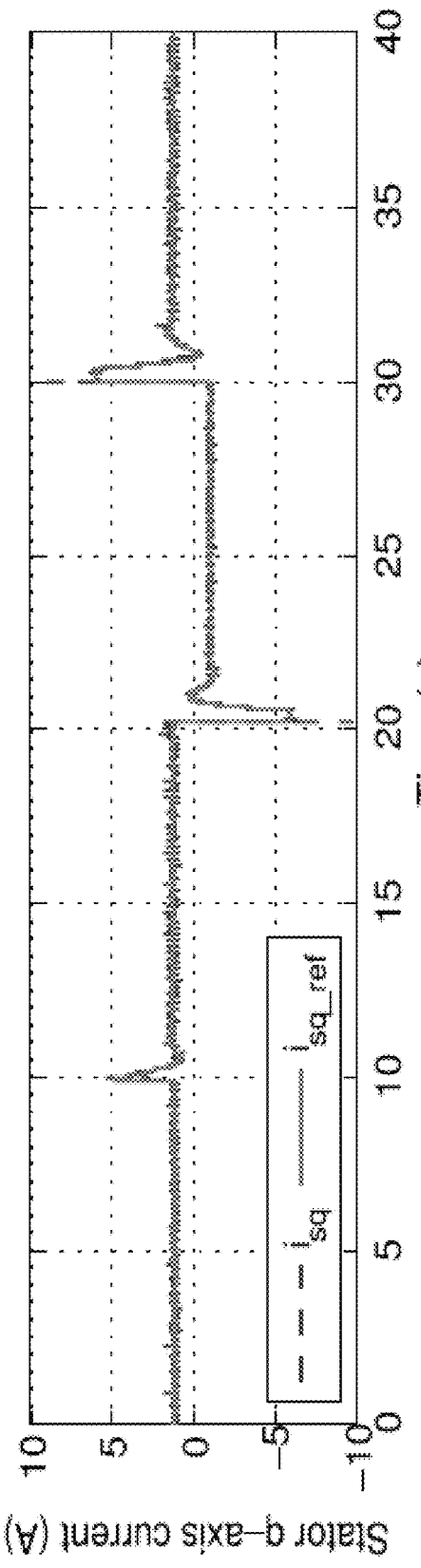
Figure 14D:
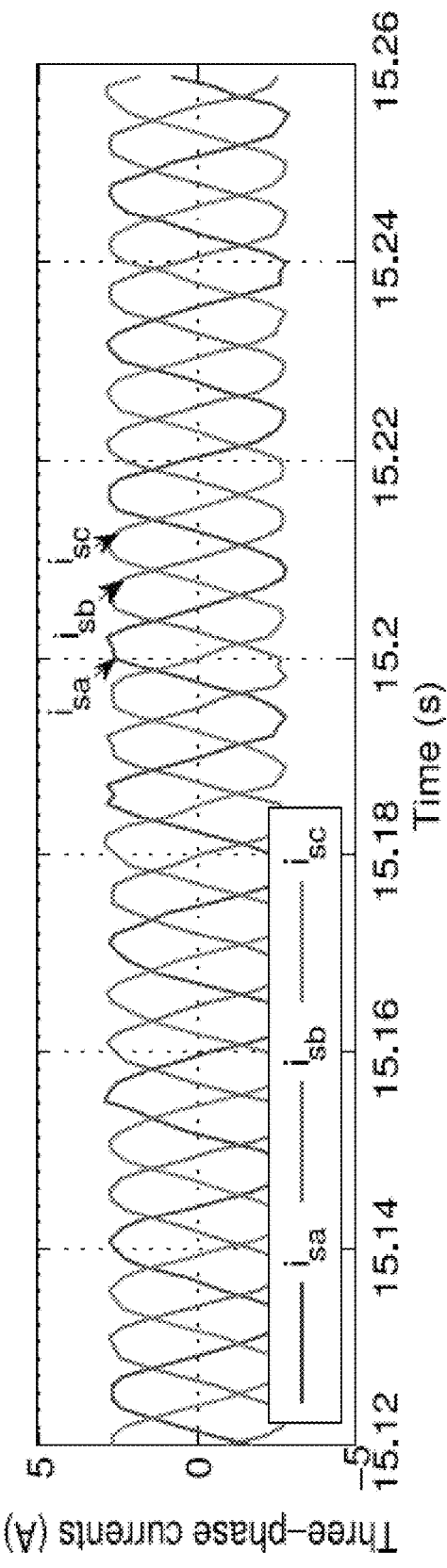
Figure 15A:
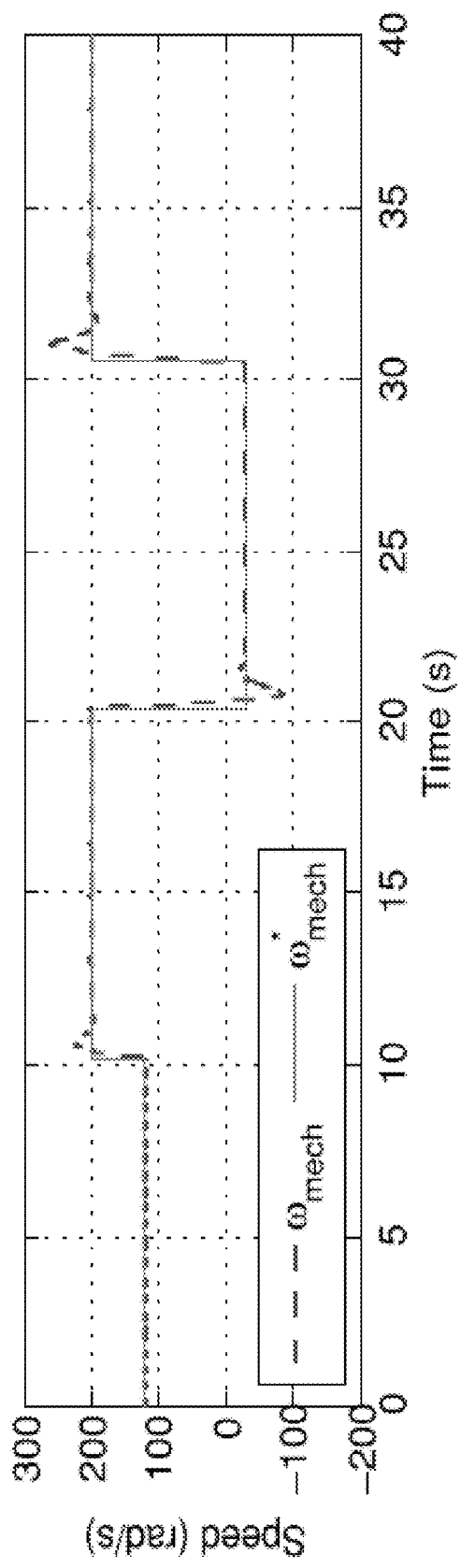
FIGS. 15A-15D illustrate conventional vector control of an induction motor during an induction motor drive experiment with $T_s$=0.1 ms and $f_s$=6 kHz where 15A shows speed, 15B shows stator d-axis current, 15C shows stator q-axis currents and 15D shows three-phase currents.
Figure 15B:
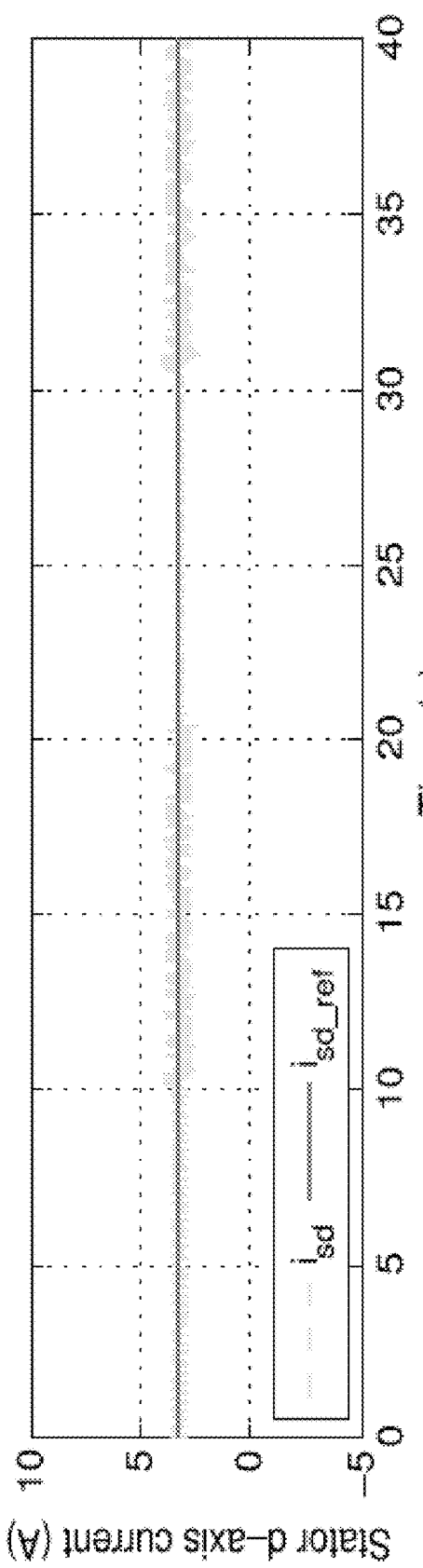
Figure 15C:
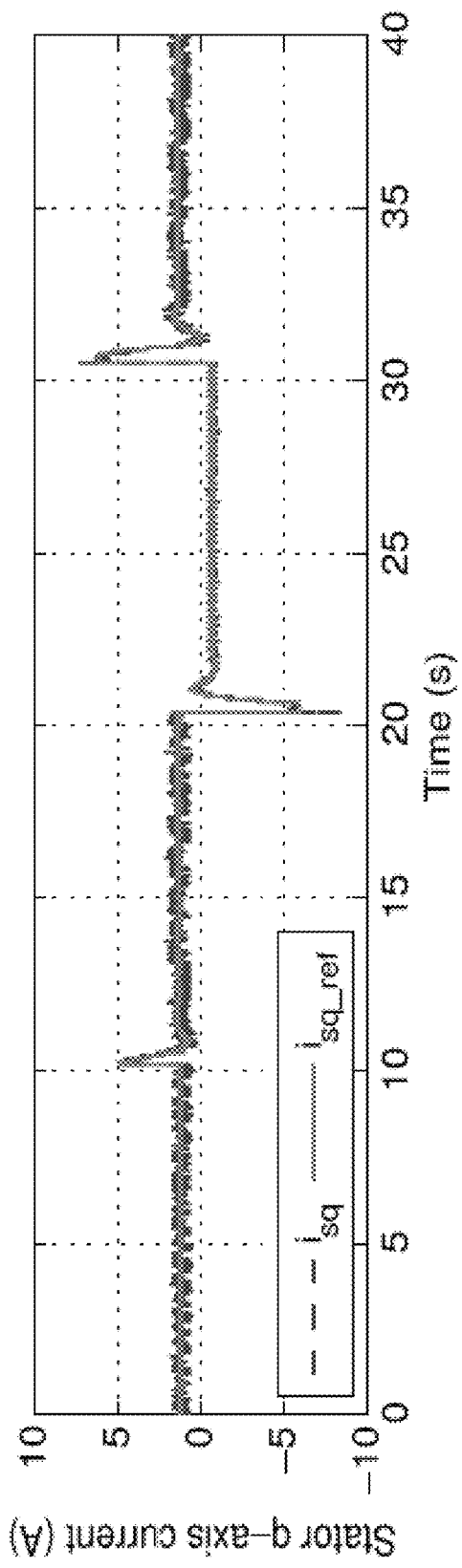
Figure 15D:
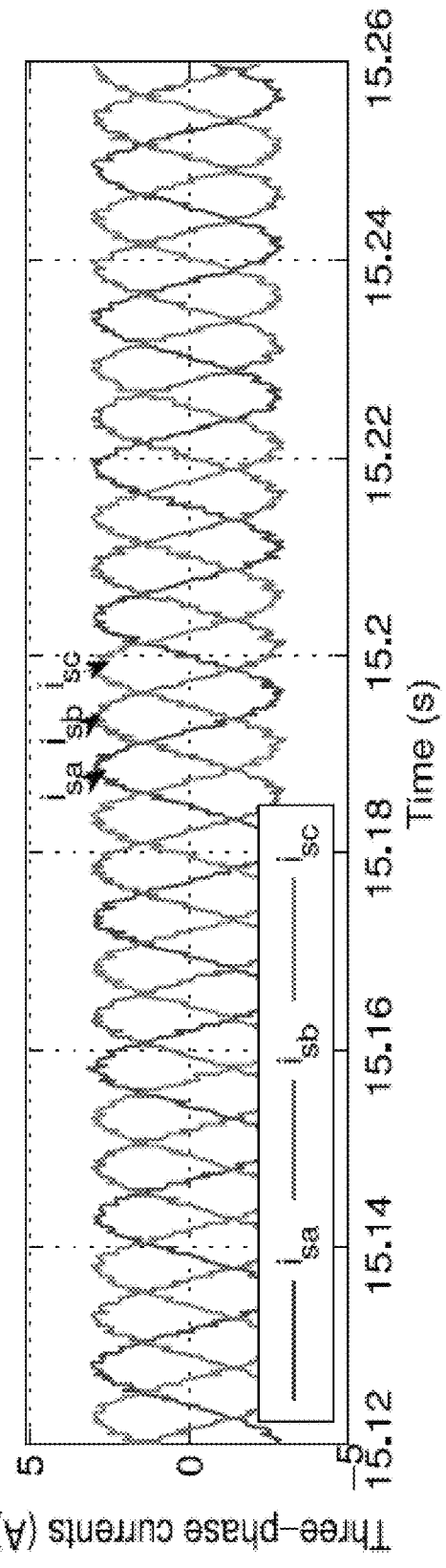

To further validate the proposed NN vector control, induction motor drive experiments were conducted based on dSPACE. FIG. 11 illustrates the experiment components and wire connections in the induction motor control experiments. FIG. 12 shows the hardware testing and control systems. Table II specifies all the parameters of the induction motor (ACMOT4166). The hardware test system took the following setups:

1) A LabVolt three power supply signifies the power source.
2) An ac/dc rectifier is connected with the power source.
3) Another dc/ac inverter is controlled by a dSPACE digital control system.
4) OP8660 collects the dc-link voltage and three-phase currents of the induction motor.
5) CP1103 I/O board connects the current and voltage measurements from OP8660, and the rotor position from the encoder and sends out control signals to the converter according to various control demands.

Experiment Results

Both conventional vector control and NN vector control used the same speed-loop PI controller with crossover frequency selected as 10 rad/s. The crossover frequency of current-loop PI controller was selected as 2000 rad/s for the conventional vector control, which tends to yield the best transient performance considering the PWM saturation constraints. The NN controller was retrained based on the induction motor parameters in Table II.

TABLE II

INDUCTION MOTOR (ACMOT4166) PARAMETERS

| Symbol | Quantity | Value | Unit |
| --- | --- | --- | --- |
| $V_g$ | rated voltage (rms) | 30 | V |
| $J_{eq}$ | inertia | 0.000225 | kg · m² |
| p | pole pairs | 4 | |
| $P_{rated}$ | rated power | 120 | W |
| $n_{max}$ | max speed | 4000 | rpm |
| $i_{racted}$ | rated current | 6 | A |
| $R_s$ | per-phase stator resistance | 0.896 | Ω |
| $R_r$ | per-phase rotor resistance | 1.82 | Ω |
| $L_{ls}$ | per-phase stator leakage inductance | 1.94 | mH |
| $L_{lr}$ | per-phase rotor leakage inductance | 2.45 | mH |
| $L_m$ | per-phase magnetizing inductance | 46.2 | mH |

When the sampling time $T_s$=0.5 ms and the switching frequency $f_s$=6 kHz were chosen, FIG. 13 shows the experiment results of induction motor under conventional vector control, while FIG. 14 shows the results under the NN vector control. As both conventional vector control and NN vector control utilized the same speed PI controller, no noticeable differences can be observed in FIGS. 13A and 14A between these two vector control methods. However, big differences can be seen from current waveforms. No matter whether from d-current or q-current, the NN vector control demonstrated much less oscillations [see FIGS. 14B and 14C] than the conventional vector control [see FIGS. 13B and 13C]. Three-phase current waveforms [see FIGS. 13D and 14D] furthermore revealed the fact. These kinds of oscillations [see FIG. 13D] are not good for induction motors and would reduce the lifetime of the induction motor. Large noise caused by this oscillation could be heard in the laboratory under the conventional vector control.

Similar tests were done with different sampling time and switching frequency settings. FIG. 15 shows the control performance of conventional vector control when using $T_s$=0.1 ms and $f_s$=6 kHz. Under this setting, the high current oscillation and large noise were gone. However, even using higher sampling rate, the conventional vector control still showed relatively larger current oscillations [see FIGS. 15B-15D] compared with the NN vector control (see FIG. 14).

Table III gives a summary of comparison results, which demonstrated that the NN vector control can achieve very good performance under relatively low switching frequency and low sampling rate ($1/T_s$). The results are consistent with that reported in A. Malfait, R. Reekmans, and R. Belmans, "Audible noise and losses in variable speed induction motor drives with IGBT inverters-influence of the squirrel cage design and the switching frequency," in Proc. IEEE Ind. Appl. Soc. Annu. Meeting, Denver, Colo., USA, October 1994, pp. 693-700; incorporated by reference, when the switching frequency is increased up to 6 kHz; the audile noise can be reduced significantly under conventional vector control. The benefits of relatively low switching frequency or low sampling rate would decrease the power loss, improve efficiency, and reduce size and cost of the motor drive system. The reason behind this improvement is the better current control ability of the NN vector control than conventional vector control. The proposed NN vector control utilizes the exact state-space model of the induction motor and thus avoids inaccurate description of the induction motor. Also, the training of the NN controller is to approximate optimal control, which improves the current control performance and makes the proposed NN vector controller less sensitive to the harmonic current distortion.

TABLE III

HARDWARE EXPERIMENT COMPARISONS

| | Method | |
|---|---|---|
| Measure | Conventional vector control | NN vector control |
| $T_s$ = 0.5 ms and $f_s$ = 6 kHz | bad | good |
| $T_s$ = 0.1 ms and $f_s$ = 4 kHz | bad | good |
| $T_s$ = 0.1 ms and $f_s$ = 6 kHz | good | good |

The proposed NN vector control mainly focuses on improvement of current-loop control performance for an induction motor drive. The substitution of PI controllers in the current loop with the proposed NN controller has brought great advantages such as small oscillation, strong tracking ability. Most importantly, the NN vector control can better overcome the problem of competing control and detuning effects properly. Hardware tests showed that the NN vector control can succeed in driving an induction motor using relatively lower switching frequency or lower sampling rate compared with conventional vector control, which would benefit the induction motor drives in multiple aspects.

Figure 16:
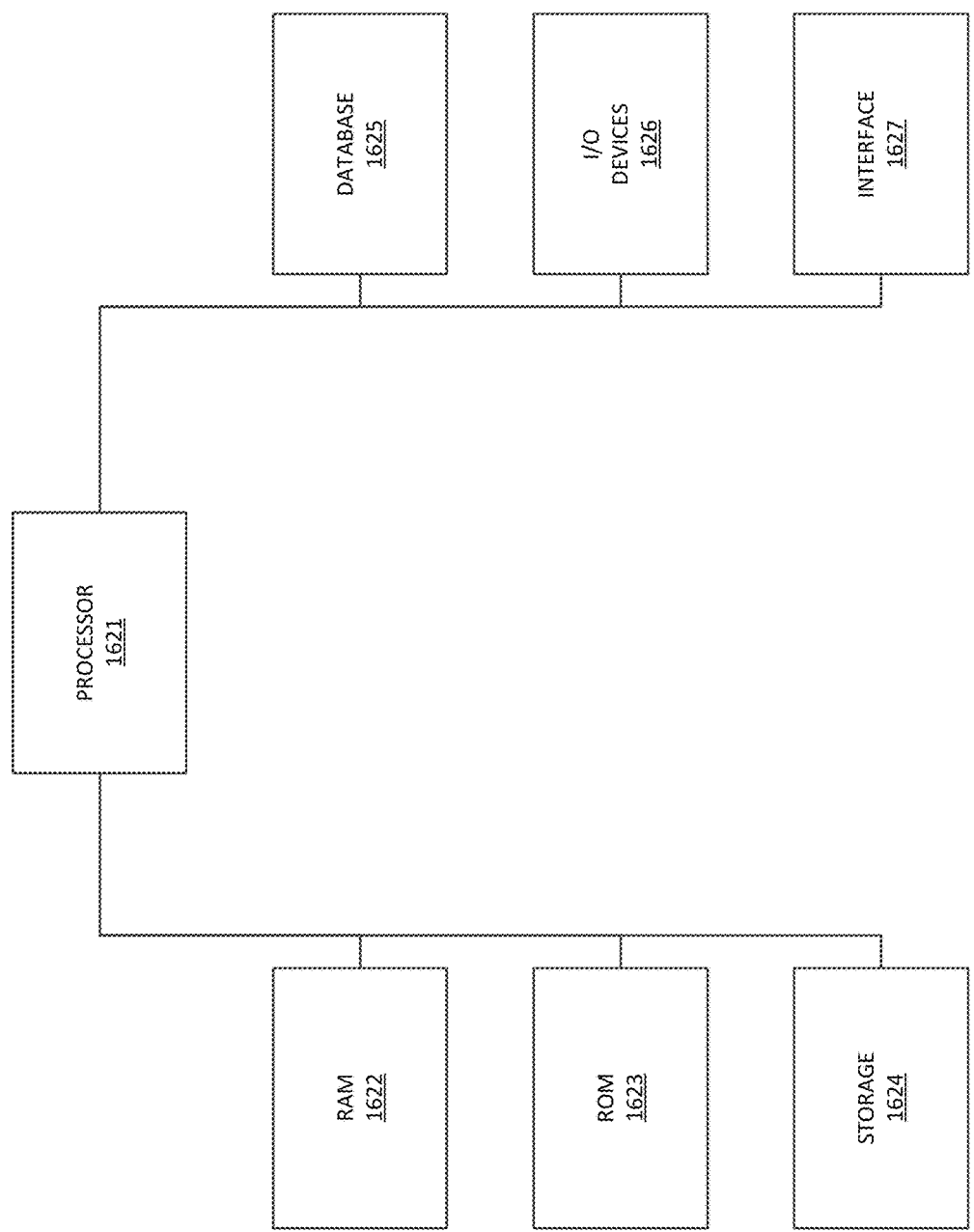
FIG. 16 illustrates an exemplary computer that can be used for controlling an induction motor.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for controlling an induction motor. In one exemplary aspect, the units can comprise a control system that comprises one or more computing devices that comprise a processor 1621 as illustrated in FIG. 16 and described below. As used herein, processor refers to a physical hardware device that executes encoded instructions for performing functions on inputs and creating outputs.

FIG. 16 illustrates an exemplary computer that can be used for controlling an induction motor. As used herein, "computer" may include a plurality of computers. The computers may include one or more hardware components such as, for example, a processor 1621, a random access memory (RAM) module 1622, a read-only memory (ROM) module 1623, a storage 1624, a database 1625, one or more input/output (I/O) devices 1626, and an interface 1627. Alternatively and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1624 may include a software partition associated with one or more other hardware components. It is understood that the components listed above are exemplary only and not intended to be limiting.

Processor 1621 may include one or more processors, each configured to execute instructions and process data to perform one or more functions associated with a computer for controlling an induction motor. Processor 1621 may be communicatively coupled to RAM 1622, ROM 1623, storage 1624, database 1625, I/O devices 1626, and interface 1627. Processor 1621 may be configured to execute sequences of computer program instructions to perform various processes. The computer program instructions may be loaded into RAM 1622 for execution by processor 1621.

RAM 1622 and ROM 1623 may each include one or more devices for storing information associated with operation of processor 1621. For example, ROM 1623 may include a memory device configured to access and store information associated with the computer, including information for identifying, initializing, and monitoring the operation of one or more components and subsystems. RAM 1622 may include a memory device for storing data associated with one or more operations of processor 1621. For example, ROM 1623 may load instructions into RAM 1622 for execution by processor 1621.

Storage 1624 may include any type of mass storage device configured to store information that processor 1621 may need to perform processes consistent with the disclosed embodiments. For example, storage 1624 may include one or more magnetic and/or optical disk devices, such as hard drives, CD-ROMs, DVD-ROMs, or any other type of mass media device.

Database 1625 may include one or more software and/or hardware components that cooperate to store, organize, sort, filter, and/or arrange data used by the computer and/or processor 1621. For example, database 1625 may store data related to the control of an induction motor. The database may also contain data and instructions associated with computer-executable instructions for controlling an induction motor. It is contemplated that database 625 may store additional and/or different information than that listed above.

I/O devices 1626 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1626 may also include a display including a graphical user interface (GUI) for outputting information on a monitor. I/O devices 1626 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1627 may include one or more components configured to transmit and receive data via a communication network, such as the Internet, a local area network, a workstation peer-to-peer network, a direct link network, a wireless network, or any other suitable communication platform. For example, interface 1627 may include one or more modulators, demodulators, multiplexers, demultiplexers, network communication devices, wireless devices, antennas, modems, and any other type of device configured to enable data communication via a communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling a three-phase induction motor, comprising:
    providing a pulse-width modulated ("PWM") converter operably connected between an electrical power source and the induction motor;
    providing a vector controller comprising a nested-loop structure, said nested-loop structure comprised of a faster inner current loop having an inner current loop controller and a slower outer speed and rotor flux loop having an outer speed and rotor flux loop controller;
    providing a neural network vector control system comprising at least a processor operably connected to the PWM converter, wherein the neural network vector control system comprises the inner current loop controller;
    providing one or more proportional-integral (PI) controllers, wherein the one or more PI controllers comprise the outer speed and rotor flux loop controller, wherein the outer speed and rotor flux loop generates d- and q-axis current references $i_{sd\_ref}$ and $i_{sq\_ref}$ used by the inner current loop controller;
    receiving, by the inner loop controller, d- and q-axis current references $i_{sd\_ref}$ and $i_{sq\_ref}$, a measured d-axis current, $i_{sd}$, and a measured q-axis current, $i_{sq}$;
    providing the neural network vector controller with input signals comprised of error signals between the measured d- and q-axis currents and the d- and q-axis current references and integrals of the error signals;
    a means for training the neural network vector control system based on approximate dynamical programming (DP) using a cost function and that utilizes a forward accumulation through time ("FATT") algorithm in conjunction with a Levenberg-Marquardt ("LM") algorithm; and
    controlling the PWM converter, wherein the trained inner current loop neural network controller implements a control function based on the error signals between actual and reference d- and q-axis currents and integrals of the error signals by applying a voltage signal $V_{dq\_ref}$ to control the PWM inverter.

2. The method of claim 1, wherein the neural network vector control system comprises two parts, an input preprocessing block and a multi-layer feed-forward network.

3. The method of claim 2, wherein the multi-layer feed-forward network comprises one input layer of four input nodes, multiple hidden layers of multiple nodes each, and one output layer of two output nodes.

4. The method of claim 3, wherein each of the nodes is configured to implement a hyperbolic tangent function.

5. The method of claim 1, wherein the objective of the training is to find an optimal trajectory of control action that minimizes the DP cost.

6. The method of claim 1, wherein the neural network vector control system is trained based on the cost function defined according to optimal control principles in dynamic programming.

7. A system comprising:
    a three-phase induction motor; and
    a control system for controlling the three-phase induction motor, wherein the control system comprises:
        a pulse-width modulated ("PWM") converter operably connected between an electrical power source and the induction motor;
        a vector controller comprising a nested-loop structure, said nested-loop structure comprised of a faster inner current loop having an inner current loop controller and a slower outer speed and rotor flux loop having an outer speed and rotor flux loop controller;
        a neural network vector control system comprising at least a processor operably connected to the PWM converter, wherein the neural network vector control system comprises the inner current loop controller; and
        one or more proportional-integral (PI) controllers, wherein the one or more PI controllers comprise the outer speed and rotor flux loop controller, wherein the outer speed and rotor flux loop generates d- and q-axis current references $i_{sd\_ref}$ and $i_{sq\_ref}$ used by the inner current loop controller,
    wherein the inner loop controller receives the d- and q-axis current references $i_{sd\_ref}$ and $i_{sq\_ref}$, a measured d-axis current, $i_{sd}$, and a measured q-axis current, $i_{sq}$;
    wherein the neural network vector controller receives input signals comprised of error signals between the measured d- and q-axis currents and the d- and q-axis current references and integrals of the error signals;
    wherein the neural network vector control system is trained based on a means for approximate dynamical programming (DP) using a cost function and that utilizes a forward accumulation through time ("FATT") algorithm in conjunction with a Levenberg-Marquardt ("LM") algorithm; and
    wherein the PWM converter is controlled by the trained inner current loop neural network controller implementing a control function based on the error signals between actual and reference d- and q-axis currents and integrals of the error signals by applying a voltage signal $V_{dq\_ref}$ to control the PWM inverter.

8. The system of claim 7, wherein the neural network vector control system comprises two parts, an input preprocessing block and a multi-layer feed-forward network.

9. The system of claim 8, wherein the multi-layer feed-forward network comprises one input layer of four input nodes, multiple hidden layers of multiple nodes each, and one output layer of two output nodes.

10. The system of claim 9, wherein each of the nodes is configured to implement a hyperbolic tangent function.

11. The system of claim 7, wherein the objective of the training is to find an optimal trajectory of control action that minimizes the DP cost.

12. The system of claim 7, wherein the neural network vector control system is trained based on the cost function defined according to optimal control principles in dynamic programming.

* * * * *